US010713289B1

United States Patent
Mishra et al.

(10) Patent No.: US 10,713,289 B1
(45) Date of Patent: Jul. 14, 2020

(54) QUESTION ANSWERING SYSTEM

(71) Applicant: Amazon Technologies, Inc., Seattle, WA (US)

(72) Inventors: Nina Mishra, Pleasanton, CA (US); Yonatan Naamad, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 497 days.

(21) Appl. No.: 15/475,458

(22) Filed: Mar. 31, 2017

(51) Int. Cl.
| | |
|---|---|
| *G06F 16/33* | (2019.01) |
| *G06F 16/332* | (2019.01) |
| *G10L 15/22* | (2006.01) |
| *G10L 15/18* | (2013.01) |
| *G10L 15/30* | (2013.01) |
| *G06F 40/295* | (2020.01) |

(52) U.S. Cl.
CPC ...... *G06F 16/3344* (2019.01); *G06F 16/3329* (2019.01); *G06F 40/295* (2020.01); *G10L 15/18* (2013.01); *G10L 15/22* (2013.01); *G10L 15/30* (2013.01); *G10L 2015/223* (2013.01)

(58) Field of Classification Search
CPC ............. G06F 16/3344; G06F 16/3329; G06F 17/278; G06F 40/295; G10L 15/22; G10L 15/30; G10L 2015/223; G10L 15/18
See application file for complete search history.

(56) References Cited

U.S. PATENT DOCUMENTS

| | | | |
|---|---|---|---|
| 4,852,173 A * | 7/1989 | Bahl ...................... | G06F 17/18 704/240 |
| 9,715,496 B1 * | 7/2017 | Sapoznik ............ | G06F 17/2715 |
| 2005/0132253 A1 * | 6/2005 | Gail ..................... | G06F 11/0709 714/25 |
| 2016/0098389 A1 * | 4/2016 | Bruno ................. | G06F 17/2705 704/9 |
| 2017/0032791 A1 * | 2/2017 | Elson .................. | G06F 16/3329 |

OTHER PUBLICATIONS

Wu, A Probabilistic Framework for Representing Dialog Systems and Entropy-Based Dialog Management Through Dynamic Stochastic State Evolution, pp. 2026-2035, Nov. (Year: 2015).*

* cited by examiner

*Primary Examiner* — Albert M Phillips, III
(74) *Attorney, Agent, or Firm* — Pierce Atwood LLP

(57) ABSTRACT

Systems, methods, and devices for performing interactive question answering using data source credibility and conversation entropy are disclosed. A speech-controlled device captures audio including a spoken question, and sends audio data corresponding thereto to a server(s). The server(s) performs speech processing on the audio data, and determines various stored data that can be used to determine an answer to the question. The server(s) determines which stored data to use based on the credibility of the source from which the stored data was received. The server(s) may also determine a number of user interactions needed to obtain data in order to fully answer the question and may select a question for a dialog soliciting further data based on the number of user interactions.

19 Claims, 18 Drawing Sheets

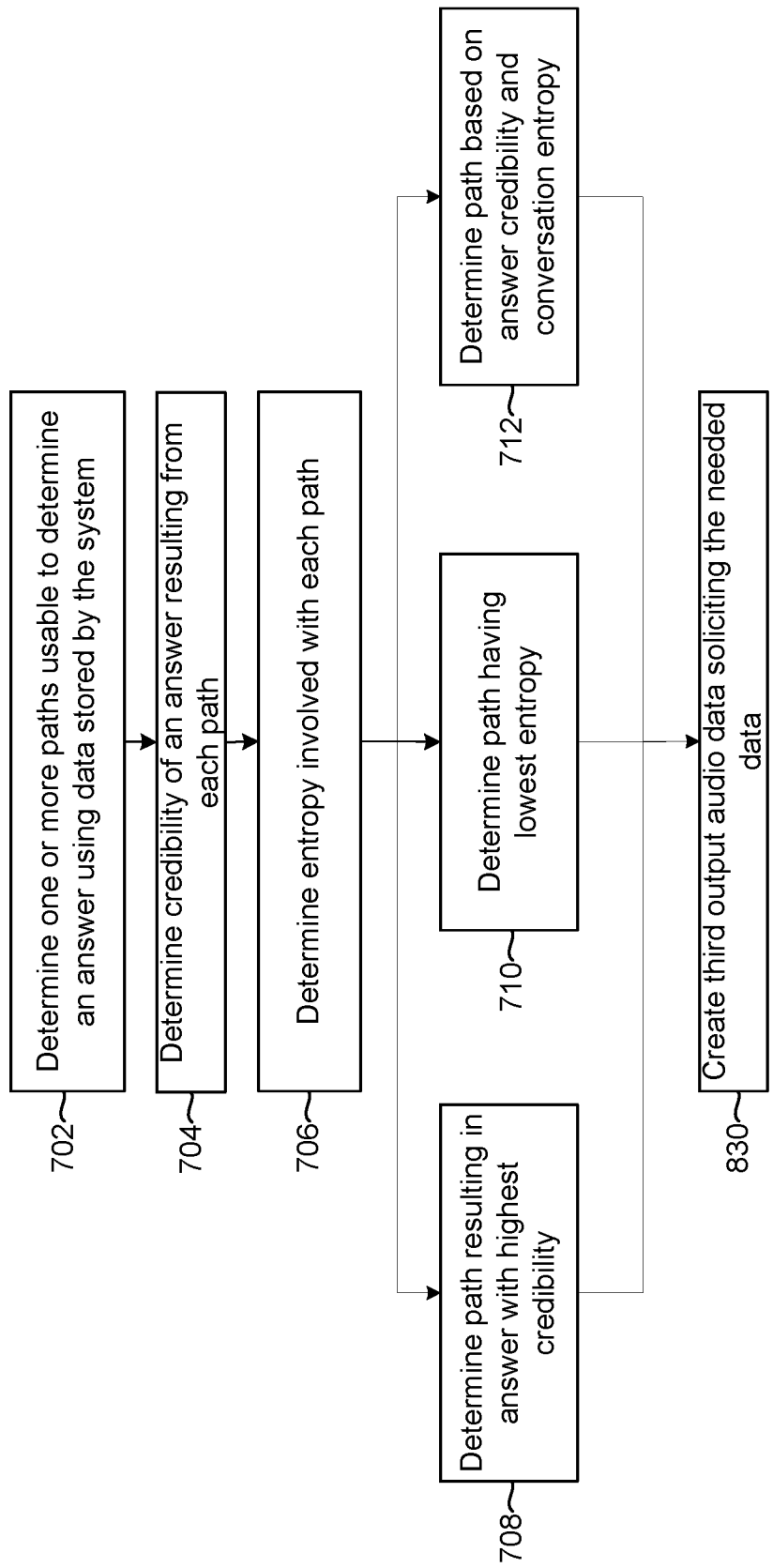

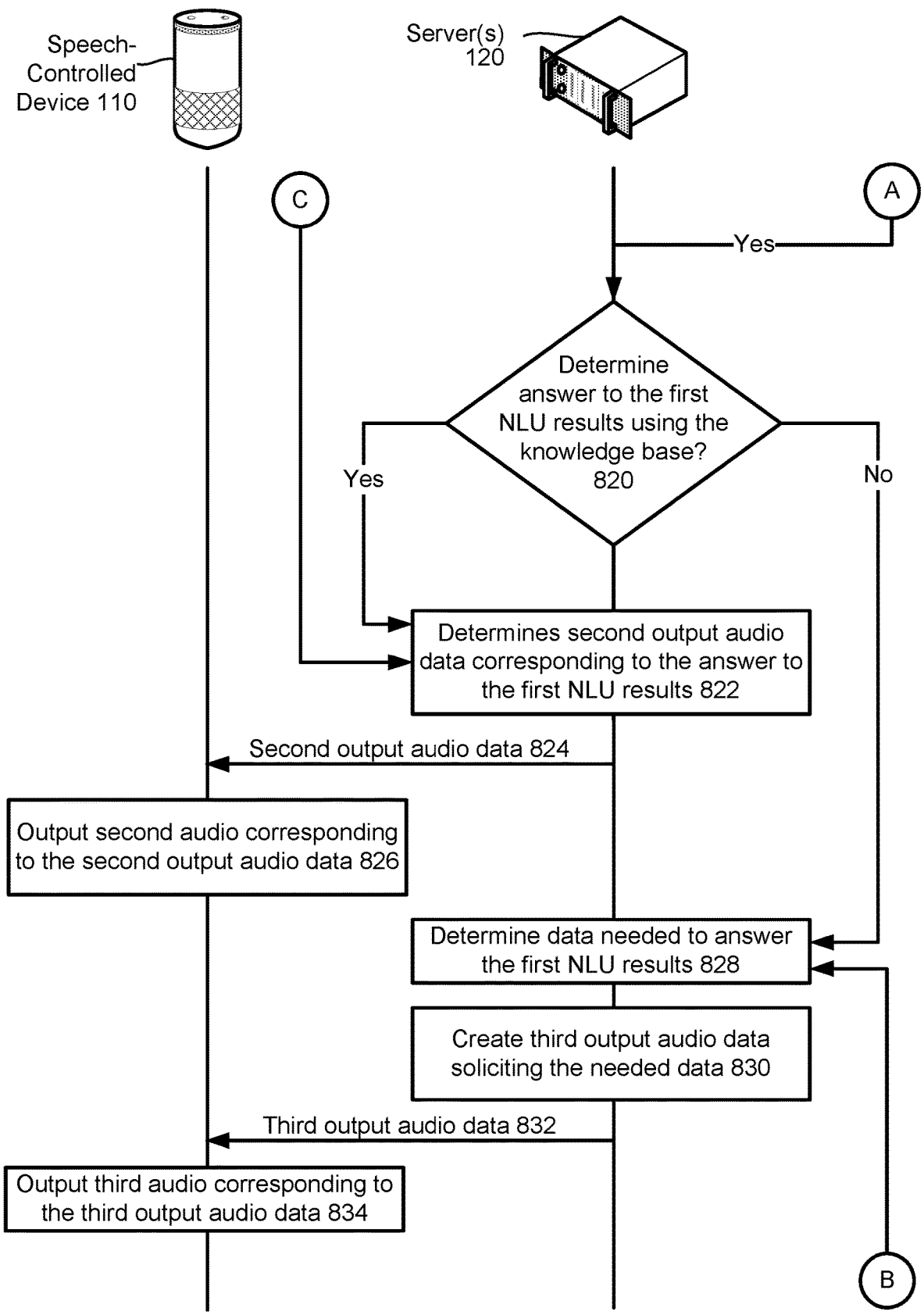

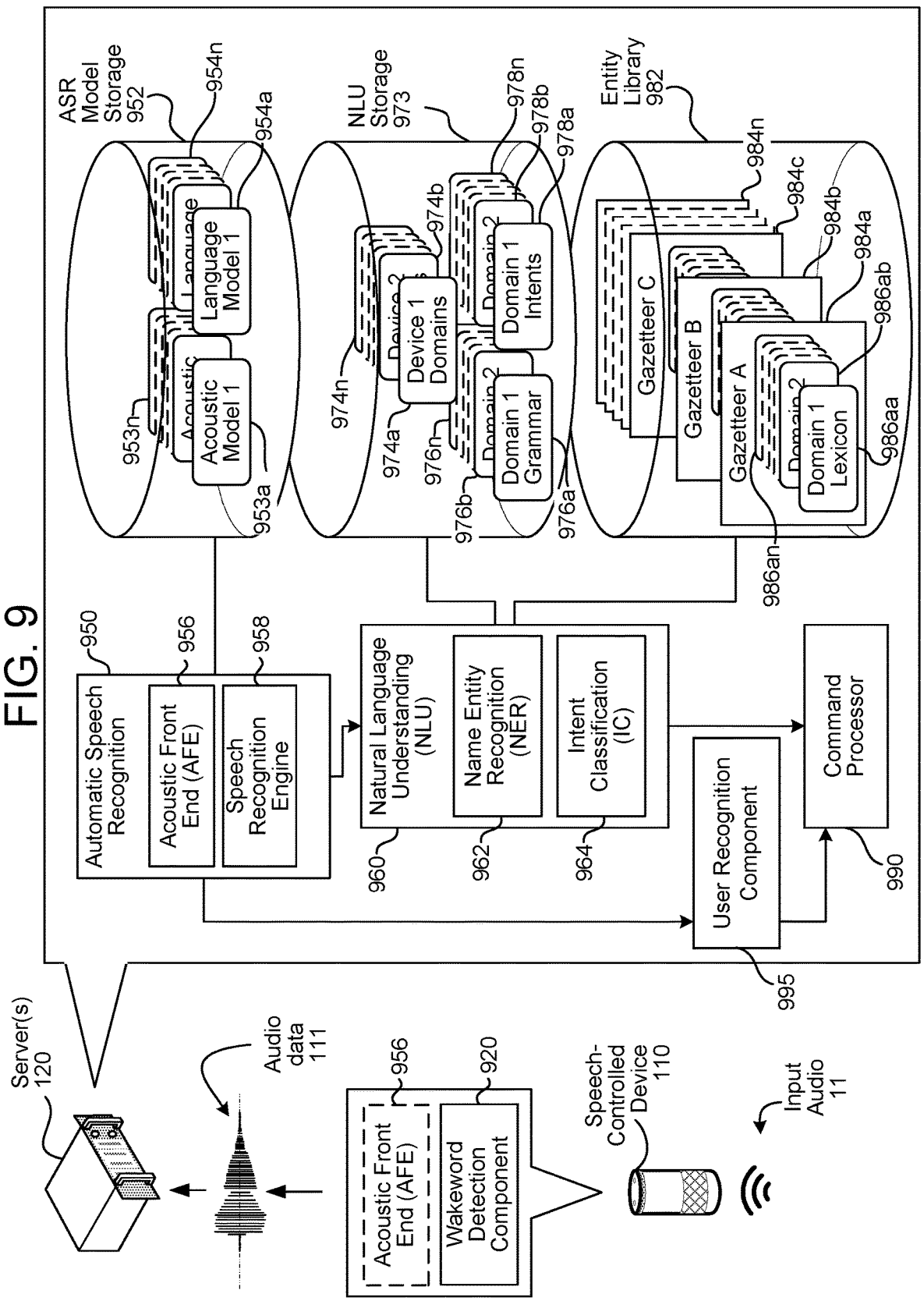

QUESTION ANSWERING SYSTEM

BACKGROUND

Computing systems have progressed to the point where they are able to answer user queries using a combination of language processing techniques. Speech recognition systems may translate spoken utterances into text and natural language understanding processing may interpret text to determine the intent of the query. Other system components may use a knowledge base or other sources to obtain information responsive to the query.

Query answering and dialog exchanges may be performed by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7 is a process flow diagram illustrating the determination of data needed to answer NLU results according to embodiments of the present disclosure.

FIGS. 8A through 8C are a signal flow diagram illustrating the determination of an answer to a spoken query based on credibility maximization and conversation entropy minimization according to embodiments of the present disclosure.

FIG. 9 is a conceptual diagram of how a spoken utterance may be processed according to embodiments of the present disclosure.

DETAILED DESCRIPTION

Figure 1:
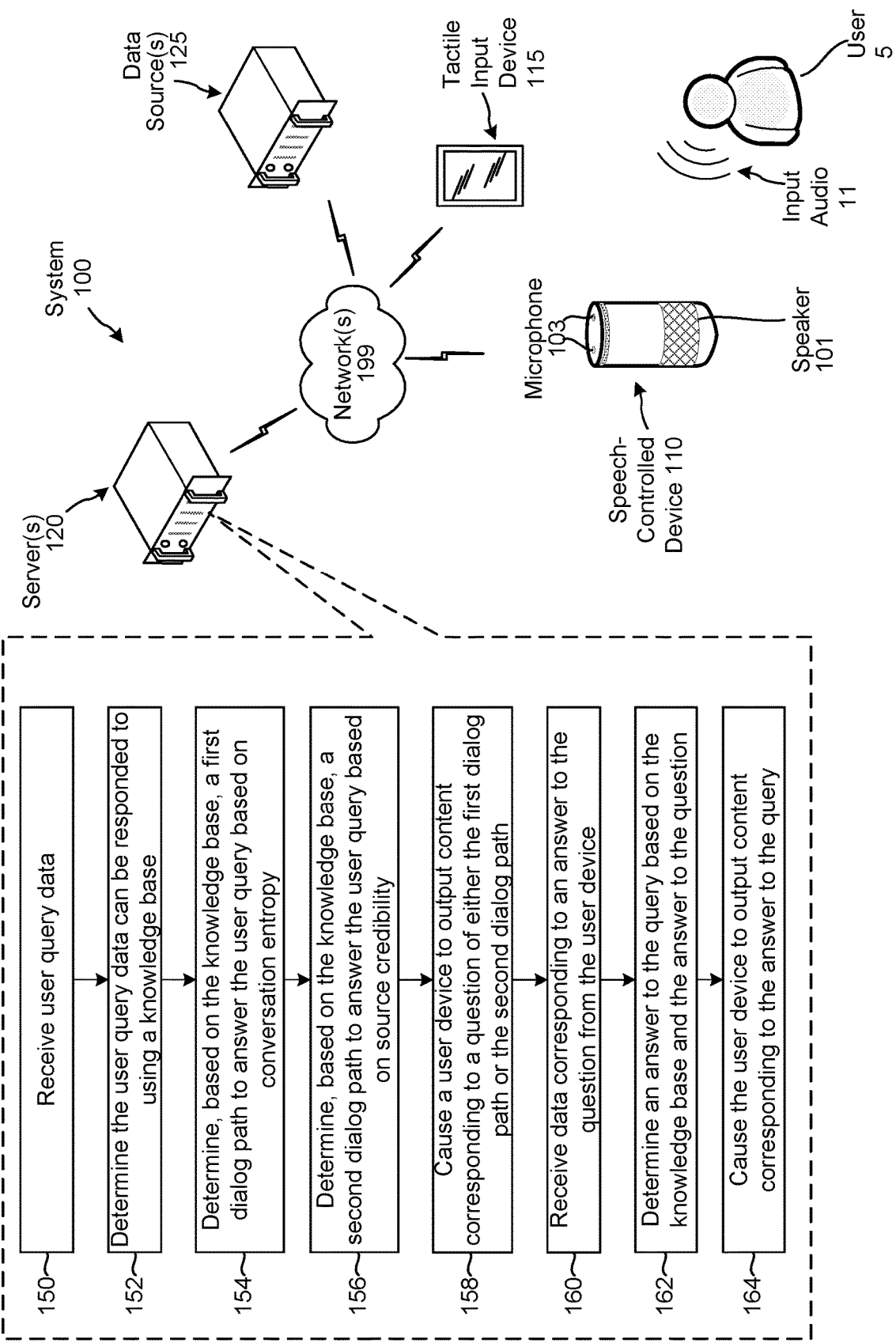
FIG. 1 illustrates a system for performing a computer-based conversation based on data source credibility and/or conversation entropy according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a system. Text-to-speech (TTS) is a field of concerning transforming textual data into audio data that is synthesized to resemble human speech.

A system may be capable of responding to user informational queries, such as requests for information, advice, or the like. The system may obtain and/or store data to be used to respond to those queries from a multitude of sources. Certain knowledge bases or information stores may store information in a "tuple" format, where entities are joined together in pairs, triplets, or the like, that define the relationship between two things. For example a tuple such as [John Doe, husband of, Jane Doe] may describe that John Doe is Jane Doe's husband. Many such tuples may exist in a knowledge base and may be usable to answer incoming informational queries. For example, the above tuple may be used to answer a question such as "who is Jane Doe's husband," "who is John Doe married to" or the like.

In the present system, however, the knowledge base may include a knowledge graph, which may comprise a directed acyclic graph (DAG) which graphs nodes representing entities (e.g., people, places, things) connected by vertices or links where each link corresponds to a relationship. To improve on the ability of a knowledge graph based system to answer questions, the system may implement the concept of functions with regard to the DAG. For example, a function may be a specific type of question that is answerable with information in the DAG along with potential information that is not in the DAG, but is obtainable by the system. Facts relevant to a particular query may be represented by leaves of the DAG. For example, for the query of "do I have a healthy weight" leaves may include waistline, gender, height, weight, or the like. The DAG may also include functions over the leaves. For example, one function may be the calculation of a body mass index (BMI) which is a function that uses height and weight. Another function may combine BMI with waistline and gender to determine a healthy weight. Thus a knowledge base may include internal nodes that are functions and leaves that represent facts that can be obtained from users. For a particular function, the system may generate a DAG portion, which is a smaller portion of a DAG that includes the facts/leaves relevant to the particular function.

To respond to a particular query, however, there may be different functions and/or leaves that the system may access to obtain an answer. The system may be able to answer a query using information already available to the system (e.g., in the knowledge base, obtainable from other sources such as a user profile, etc.) or the system may need to obtain further information from a user to respond to the query. For example, if the system knows a user's height and gender, but not the user's weight, the system may engage in a dialog (e.g., exchange of question(s) and answer(s)) with the user to obtain the user's weight in order to answer the question of whether a user has a healthy weight. To improve the system's operation with regard to dialog exchanges with the user, the system may incorporate the concepts of credibility and/or entropy to improve the user's experience, as explained below.

To improve system operation, the system may associate such with credibility scores indicating a credibility of the data source from which the data was received. For example, if data related to a particular subject is received from a peer reviewed journal as well as an unreviewed or unauthenticated blog, the data received from the peer reviewed journal may have a higher credibility score than the data received from the blog. The system may use such credibility determinations/scores when responding to user queries in order to improve the user experience by providing credible information.

The system may include a user device controlled at least partially by user speech. A user may speak a query to the device, such as "do I have a healthy weight?" A user may also enter the query to the device using text input such as, for example, a short message service (SMS) or a natural language search engine. Follow up questions asked by the system may also be transmitted to the user using text. In order to answer the query, the system may need to process various portions of the data received from various data sources. When accessing the data, the system may determine it needs additional user input to determine an answer to the user's question. For example, in order to answer whether the user has a healthy weight, the needed data may include the user's weight, height, age, etc. The system may already include stored data corresponding to certain aspects of the needed data in a user profile or other data source. Alternatively, the system may solicit user speech indicating the needed data.

The data used to answer the user's question may depend on the subject/importance of the question. As discussed above, data may be associated with a credibility score based on the source of the data. Questions involving the health of the user may be more appropriately answered using highly credible data (e.g., answered using data associated with high credibility scores) whereas other lower importance questions (such as television schedule information) may not require highly credible data (e.g., answered using data associated with lower credibility scores) to respond. The importance of a particular query subject may be dynamically configured based on a variety of factors thus customizing the experience for a particular user. For example, a particular user may consider a television schedule query more important than health information. The system may be configured to respond accordingly. For a particular incoming query the system may thus determine a credibility or other threshold to be used to filter data sources to respond to the query. The threshold may be determined based on an identity of the user, user query history, user characteristic (such as hobby, medical condition, etc.), or other factor. Alternatively, the system may simply select a path or answer that is the most credible.

As discussed above, the system may solicit user speech indicating data needed to answer the user's question if the data needed is unavailable to the system. A single user question may be answered using different paths of questioning. For example, to determine if a user has a healthy weight using one data source's data may only require the system to know the user's age and weight (such as when a first source can provide an answer to the query using just age and weight), whereas using another data source's data may require the system to know the user's age, weight, and height (such as when a second source can provide an answer to the query using age, weight, and height). In certain implementations, the system may be configured to choose the path that involves the least amount of user data/user interactions to answer the question. This may be referred to as choosing the path with the least amount of entropy (where entropy is an indication of user interaction needed to respond to the query). The decision to choose the path with the least amount of entropy (e.g., the least amount of user data needed or the least amount of user interactions) may be altered based on the credibility of the data. For example, if the question is a health question, and there is a first path for answering the question with a low entropy and low credibility and a second path for answering the question with higher entropy and a higher credibility, the system may choose the higher entropy path in order to achieve a higher credibility answer. Various factors such as entropy, credibility, etc. may thus operate to determine a data source to respond to a user query. The entropy may also be maximized based on heuristics. For example, one user may desire a longer conversation (i.e., more user prompts) while another user may desire the least amount of user prompts.

FIG. 1 shows a system 100 that performs a computer-based conversation based on data source credibility and/or conversation entropy. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 and/or one or more tactile input devices 115 local to a user 5, as well as one or more networks 199 and one or more servers 120 connected to the speech-controlled device(s) 110 and/or the tactile input device(s) 115 across the network(s) 199. The server(s) 120 (which may be one or more different physical devices) may be capable of performing traditional speech processing (e.g., ASR, NLU, command processing, etc.) as described herein. A single server 120 may perform all speech processing or multiple servers 120 may combine to perform all speech processing. Further, the server(s) 120 may execute certain commands, such as answering spoken queries of the user 5. In addition, certain speech detection or command execution functions may be performed by the speech-controlled device 110.

As shown in FIG. 1, the speech-controlled device 110 may capture a spoken utterance corresponding to a query (i.e., input audio 11) of the user 5 via a microphone 103 of the speech-controlled device 110. The speech-controlled device 110 sends input audio data (corresponding to the input audio 11) to the server(s) 120 for processing. Alternatively, a microphone array (not illustrated), separate from the speech-controlled device 110, may capture the input audio 11. In an example, the microphone array is in direct communication with the speech-controlled device 110 such that when the microphone array captures the input audio 11, the microphone array sends the input audio data to the speech-controlled device 110. The speech-controlled device 110 may then forward the received input audio data to the server(s) 120. In another example, the microphone array is in indirect communication with the speech-controlled device 110 via a companion application of a mobile computing device, such as a smart phone, tablet, laptop, etc. In this example, when the microphone array captures the input audio 11, the microphone array sends the input audio data to the companion application, which forwards the input audio data to the speech-controlled device 110. The speech-controlled device 110 may then forward the input audio data to the server(s) 120. In yet another example, the microphone array is in indirect communication with the server(s) 120 via the companion application such that when the microphone array captures the input audio 11, the microphone array sends the input audio data to the companion application, which forwards the input audio data to the server(s) 120.

As also shown in FIG. 1, the tactile input device 115 (i.e., a device including an alphanumeric keyboard) may capture a user query in the form of text data entered using a keyboard. The tactile input device 115 sends input text data to the server(s) 120 for processing.

The server(s) 120 receives (150), from either the speech-controlled device 110, a companion application, or the tactile input device 115, the user query data. For example, the user query data may correspond to "is my weight healthy." The user query data may be in the form of audio data, text data, video or image data (which may include a representation of a gesture to be interpreted as a query) or other form of data.

The server(s) 120 may determine (152) the spoken query can be responded to using a knowledge base. The knowledge base may include data received from various data source device(s) 125 maintained by entities different from the entity that maintains the server(s) 120. The knowledge base may include tables, graphs, or other forms of data that the system may use to respond to a query. Such a table may include, and a graph may be generated using, data of a different data source (e.g., data received from a different data source device(s) 125). Moreover, a table, graph, or other data form may be associated with a credibility score associated with the data source. For example, peer reviewed data and double blind study data may have higher credibility scores than data received from blog posts, newsfeeds, etc.

The server(s) 120 may determine (154), based on the knowledge base, a first dialog path to an answer the user query based on conversation entropy. For example, multiple dialog paths may exist, and each dialog path may result in an answer to the user query. Moreover, each dialog path may be associated with a different entropy (i.e., associated with a different number of user-device interactions required for the dialog path to provide an answer). If the query is a health question, tables and/or graphs in the knowledge base storing health data may be used to determine one or more dialog paths.

The server(s) 120 may also determine (156), based on the knowledge base, a second dialog path to answer the user query based on source credibility. The knowledge base may include data from multiple sources. Moreover, each source may have a different credibility associated therewith. Accordingly, different dialog paths may produce answers of different credibility based on the sources of data used by the respective dialog path.

The server(s) 120 causes (158) a user device (i.e., the speech-controlled device 110 or the tactile input device 115) to output content corresponding to a question of either the first dialog path or the second dialog path. For example, the data output by the speech-controlled device 110 may be audio and the data output by the tactile input device 115 may be text. The server(s) 120 may determine the user device to output the content based on a user profile associated with the devices. For example, a camera may capture a representation of the user 5. The server(s) 120 may determine a location of the user based on the representation, access a profile of the user 5, and determine a device in the profile most proximate to the user 5 for outputting the content. The user device may, after outputting the content, capture data corresponding to an answer to the question. The user device may send the data corresponding to the answer to the server(s) 120.

The server(s) 120 receives (160) the data corresponding to the answer from the user device. The server(s) 120 determines (162) an answer to the initial user query using the answer to the question and the knowledge base. The server(s) 120 then causes (5164) the user device to output content corresponding to the answer to the query.

The system 100 may chose a dialog path based on an answer credibility threshold. The threshold that may need to be met or exceeded in order for the answer to be considered adequate may be based on, for example, an identity of the user, user query history, user characteristic(s) (e.g., hobby, medical condition, etc.), or other factors. With respect to the identity of the user, a first user may require answers be at least 50% credible, a second user may require answers be at least 60% credible, etc. Regarding user query history, a first user's query history may indicate the user thought provided answers having an average credibility of 40% adequate, a second user's query history may indicate the user through provided answers having an average credibility of 50% adequate, etc. Regarding user characteristic, a single user may require answers of different topics or types to meet or exceed different credibility thresholds. For example, a single user may require answers to health questions meet or exceed a 80% credibility threshold, may require answers to television programming meet or exceed a 50% credibility threshold, etc. Only after determining the credibility is above the threshold may the system 100 output the answer. The threshold may deviate based on the importance of the spoken query. For example, if the system 100 determines the spoken query is a health question, the system 100 may require a high threshold be met or satisfied. For further example, if the system 100 determines the spoken query is a purchase question (e.g., which computer should I buy), the system 100 may require a lower threshold be met or satisfied.

Figure 2:
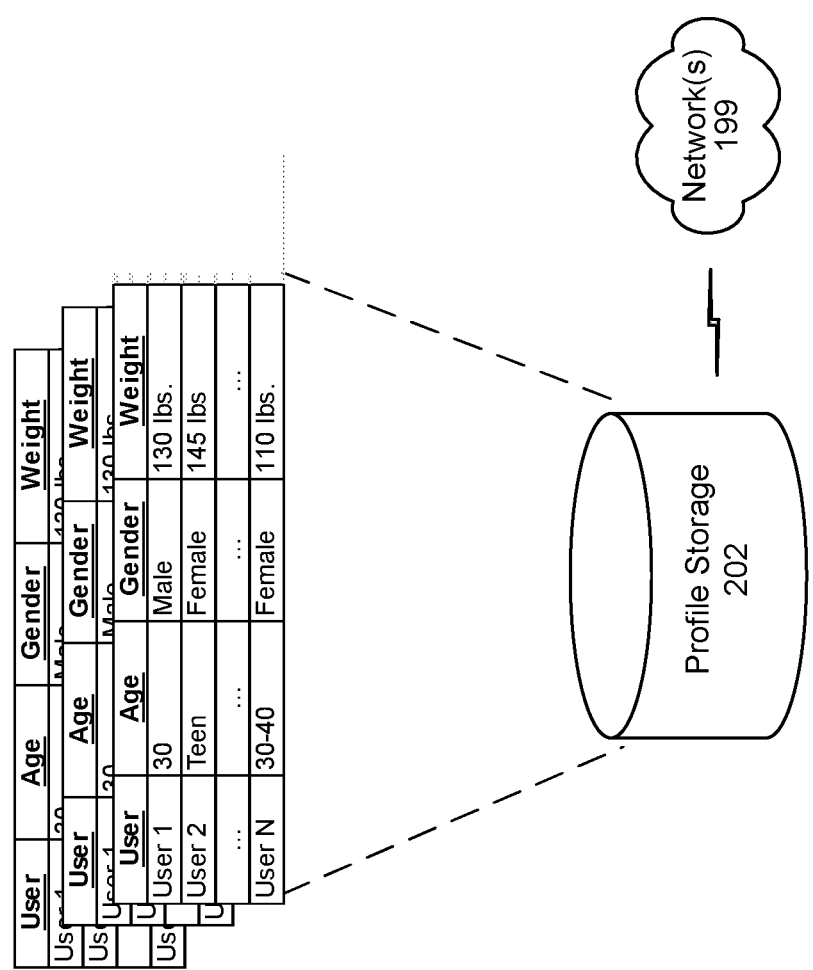
FIG. 2 illustrates data stored and associated with user profiles according to embodiments of the present disclosure.

FIG. 2 illustrates a profile storage 202 that includes data regarding user accounts and/or respective devices as described herein. The profile storage 202 may be located proximate to the server(s) 120, or may otherwise be in communication with various components, for example over the network(s) 199. The profile storage 202 may include a variety of information related to individual users, accounts, devices, etc. that interact with the system 100. In an example, the user profile storage 202 is a cloud-based storage. Each profile may include data such as device identifier (ID) data, internet protocol (IP) address data, name of device data, and location of device data for different devices. In addition, each profile may include personal identification information of a user, or other information used as context by the system in determining an answer to the spoken query. The personal identification information may include age, gender, height, eye color, weight, etc. The user profile may also include a variety of other information such as user home address, work location, employment information, hobby information, or other information.

Figure 3A:
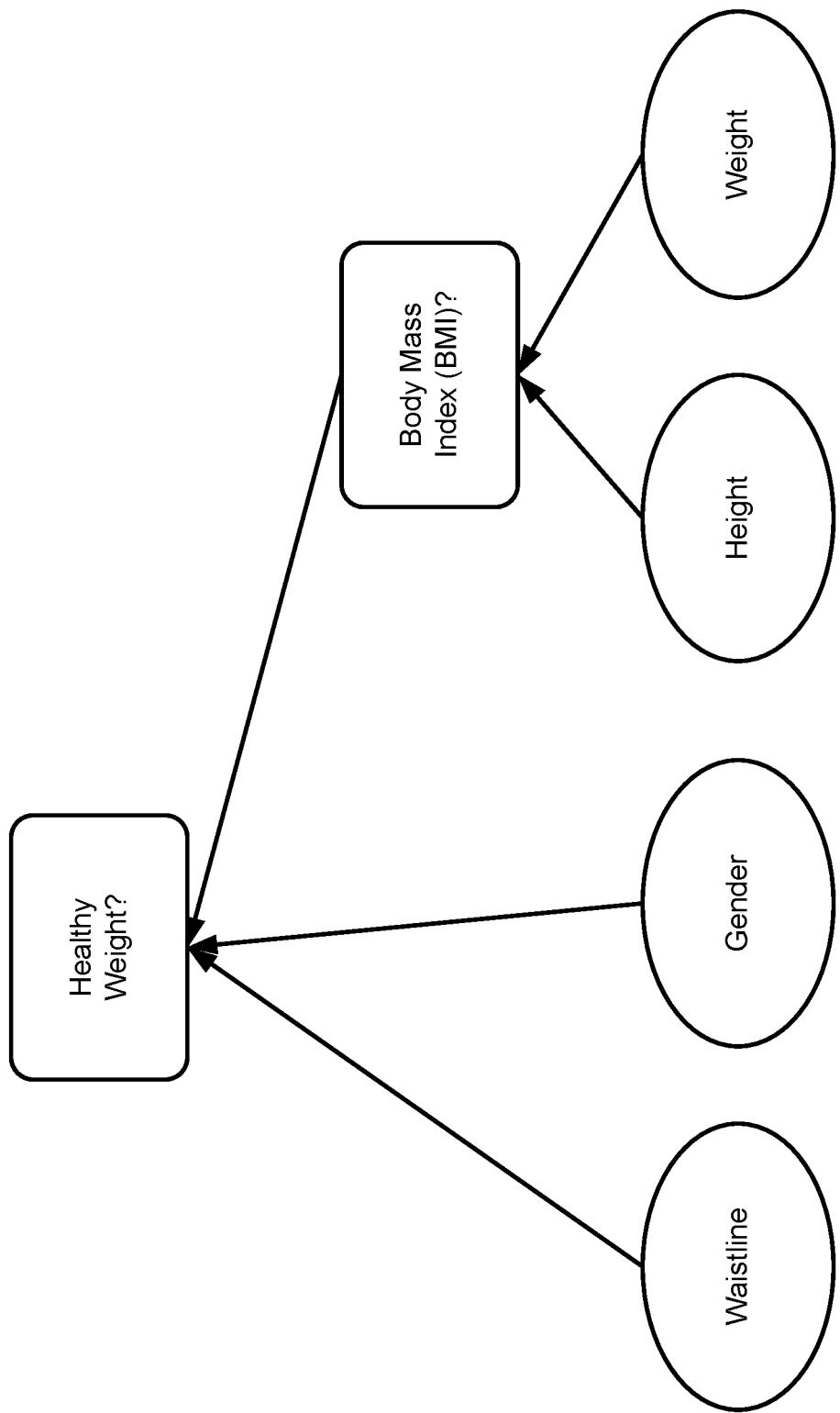
FIGS. 3A-3B illustrate selecting a path for responding to a spoken query based on data source credibility and/or entropy for different domains according to embodiments of the present disclosure.

As discussed above, the system 100 may be configured to increase the credibility of an answer to a query. Such credibility considerations may depend on the source of data used to compute the answer and other factors such as how many data points are used to compute the answer. FIG. 3A illustrates an example portion of a DAG that represents two different ways a system may determine an answer to a user query regarding whether a user has a healthy weight. For example, a user may speak a query in which the user requests to know whether their weight is healthy. The system 100 may determine what information can be used to respond to the query and then may determine whether the user's weight is healthy using various inputs, such as the user's waistline, gender, height, and weight.

While various techniques are available for determining a healthy weight, two are illustrated in FIG. 3A. One option allows the system 100 to determine whether the user's weight is healthy based on the user's waistline and gender. The system 100 may identify a table of data specific to the gender of the user, and having waistline data associated with healthy weight ranges for the waistline. The system may then determine whether the user's weight is within the range of healthy weights. The table of data used to determine the healthy weight in the above example may have a low credibility score since the health weight ranges are calculated simply on waistline and gender.

Another option allows the system 100 to determine whether the user's weight is healthy based on the user's BMI, which in turn is based on the user's height and weight. Based on the user's height and weight, the system 100 may use the stored knowledge base to calculate the user's body mass index (BMI). Based on the user's BMI, the system 100 may determine whether the user's weight is healthy. BMI calculations may be associated with a high credibility since the medical profession may consider BMI to be a more accurate representation of a healthy weight as compared to determining healthy weight based on waistline and gender. Based on this and the system 100 being configured to maximize the credibility of the answer to the spoken query, the system 100 may determine whether the user's weight is healthy based on the BMI instead of waistline and gender.

Figure 3B:
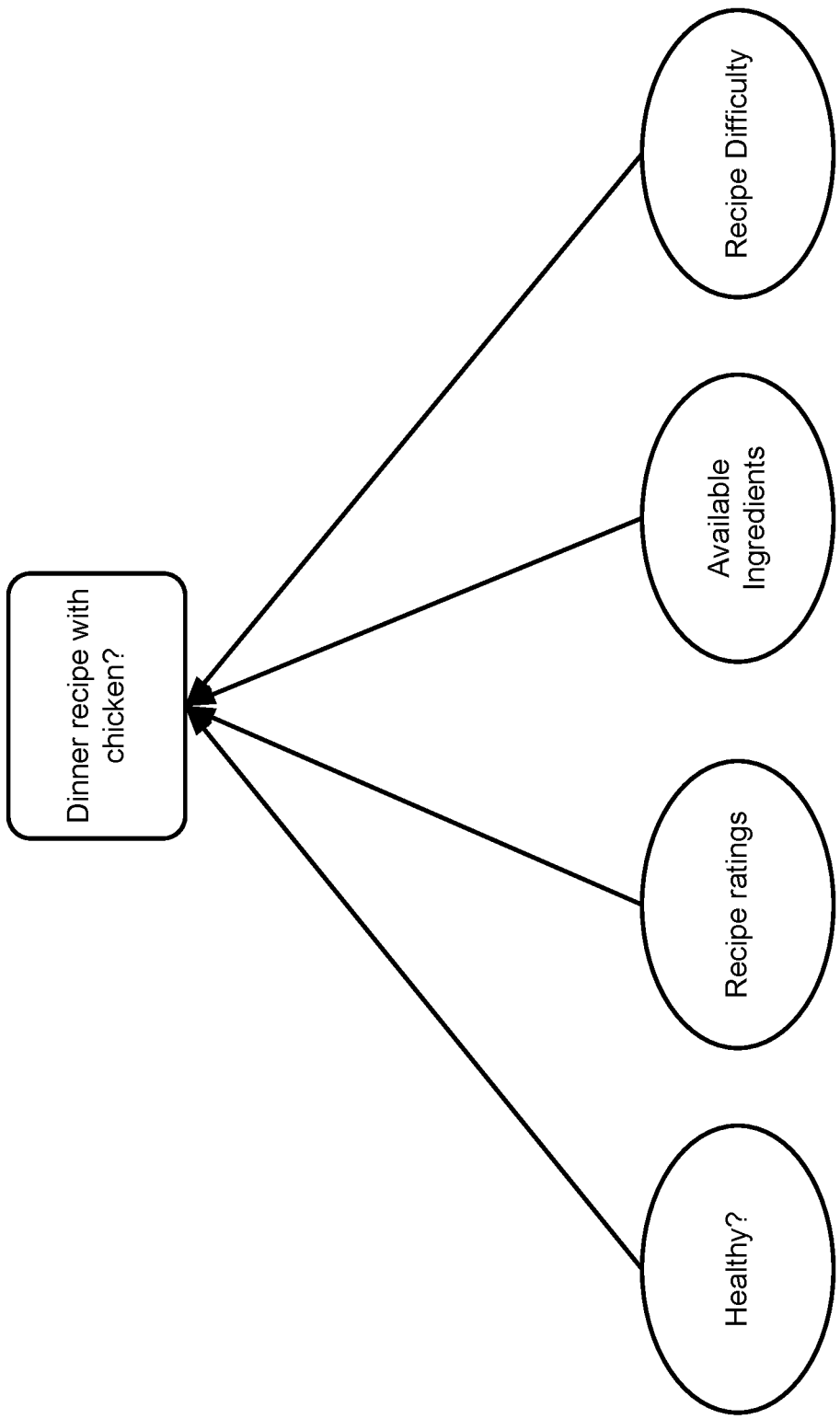

In another example, illustrated by FIG. 3B, a user may ask the system for a recipe. For example, a user may ask the system "what should I cook for dinner that has chicken in it?" The system 100 may perform speech processing on the incoming audio data corresponding to the query to determine that the user is asking for a dinner recipe involving chicken. The system may have access to a number of recipe sources and individual recipes. Specific recipes and/or sources may be associated with certain credibility scores that may be related to, for example, the ratings associated with a particular recipe or source where the ratings may have been submitted by other users and may be available on a recipe website. The credibility score of a particular recipe may also be based on other factors such as how healthy a recipe is. For example, a user profile 202 associated with the querying user may indicate that healthier recipes (e.g., recipes with low carbohydrates, low fat, low sugar, or the like) should receive higher credibility scores for the user.

The user profile 202 (or other data source) may also include information about the cooking skill of the user and such information may be used to increase or decrease an entropy score for a recipe, for example where novice cook may result in a high entropy score for a difficult recipe as the user may need to have multiple interactions with the system to explain complex cooking steps. The user profile 202 (or other data source) may also include information about what ingredients are available to the user and what ingredients may require a trip to the store. For example, if the user has a smart refrigerator 110*f* (illustrated in FIG. 11) or other smart appliance, or the system 100 is otherwise used to assist the user in shopping (such as by forming grocery lists or the like), the system may have information about what ingredients are available to the user. Such information may be used to adjust one or more scores of a recipe. The system 100 may also adjust the credibility and/or entropy score of a particular recipe based on other data that may be associated with the user profile 202, for example other recently cooked recipes (which may be used to adjust scores for recently made recipes), allergy information (which may be used to adjust scores for, or eliminate, recipe choices that may involve sensitive or allergic reaction inducing ingredients), cuisine type preferences, or other information.

Although 3A and 3B illustrate answer selection using two different examples, it can be appreciated that the present system may be used to answer questions of a variety of subject matters using a variety of different data.

Figure 4A:
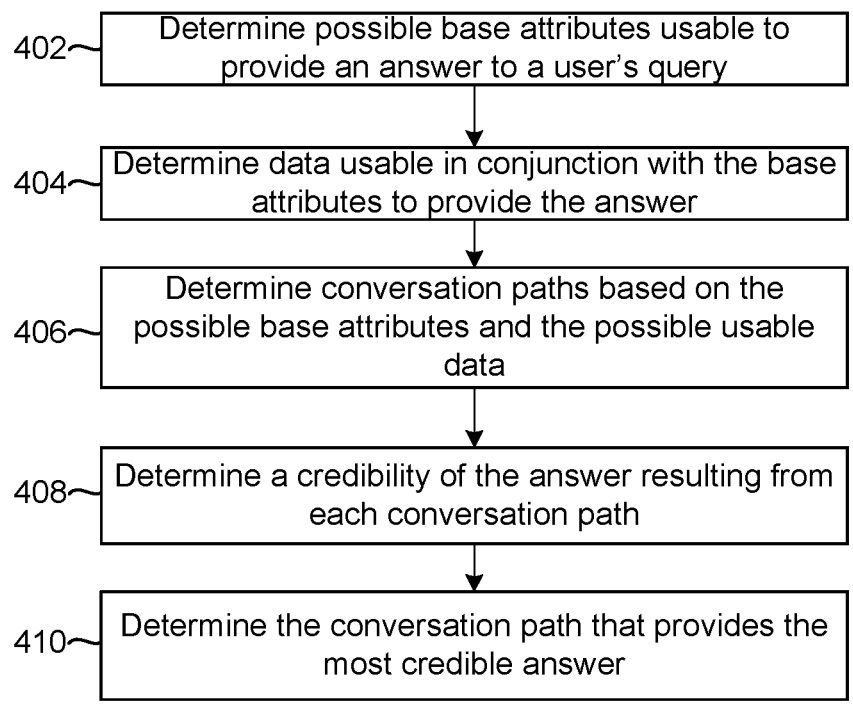
FIG. 4A is a process flow diagram illustrating a method for performing a computer-based dialog based on credibility according to embodiments of the present disclosure.

FIG. 4A illustrates a method for performing a computer-based conversation based on credibility. The server(s) 120 may determine (402) possible base attributes usable to determine an answer to a user's query. A base attribute may be provided by the user in response to a system prompt soliciting the attribute from the user. The server(s) 120 may also determine (404) data usable in conjunction with the possible base attributes to determine the answer to the user's query. The server(s) 120 may then determine (406) possible dialog paths involving the possible base attributes and the possible usable data. For any given set of possible base attributes and usable data, a plurality of possible dialog paths may exist. Each base attribute and each portion of usable data may be associated with a respective credibility score. Thus, the server(s) 120 may determine (408) a credibility of the answer to the query as a result of each dialog path since each dialog path may use different attributes and/or usable data. The server(s) 120 may use a bottom up approach to determine the credibility of the answer for each dialog path. For example, for a single credibility path, the server(s) 120 may multiply the credibility of each applicable base attribute with the credibility of data usable with the base attributes to create an output. Such bottom up approach is described in particularity with respect to FIG. 5 below. Once the credibility of the answer as provided by each respective dialog path is determined, the server(s) 120 determines (410) the credibility path providing the most credible answer for use in determining the answer to the user's query. The process described with respect to FIG. 4A may be performed a single time with respect to a particular query even if the query is submitted to the system multiple times. Such implementation may be usable when the underlying base attributes and usable data remain constant over time. Alternatively, the process described with respect to FIG. 4A may be performed each time the query is submitted to the system. This allows the system to update dialog paths and associated credibilities due to changes in the underlying base attributes and/or usable data. For example, as new usable data is ingested by the system, the possible base attributes may change because the new usable data may be configured to receive different or additional base attributes as input as compared to previously ingested usable data.

Figure 4B:
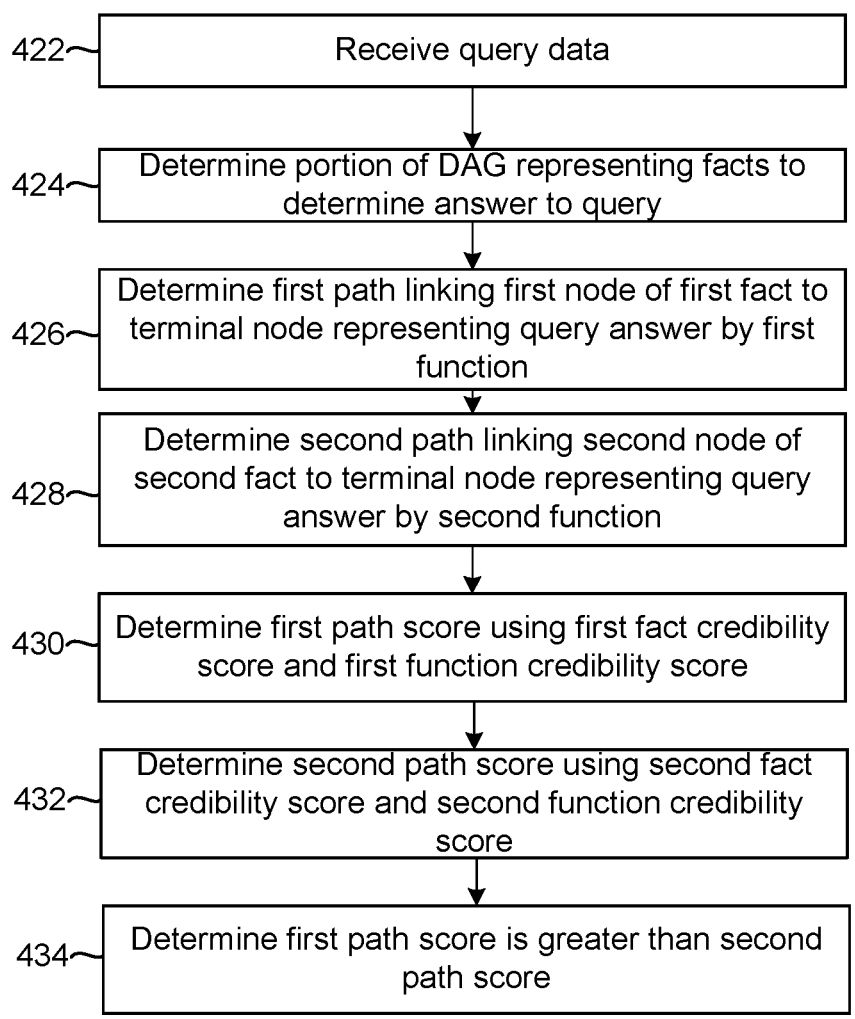
FIG. 4B is a process flow diagram illustrating a method for performing a computer-based dialog based on credibility according to embodiments of the present disclosure.

FIG. 4B illustrates a method for performing a computer-based conversation based on credibility. As shown in FIG. 4B, a server(s) 120 may receive (422) query data. The server may then determine (424) a portion of a directed acyclic graph (DAG) representing facts that may be used to determine an answer to the query. The server 120 may determine (426) a first path of the portion, wherein the first path links a first node representing a first fact to a terminal node representing an answer to the query. The server 120 may determine (428) a second path of the portion, wherein the second path links a second node representing a second fact to the terminal node. The server 120 may determine (430) a first path score corresponding to the first path using a first fact credibility score associated with the first fact and a first function credibility score associated with a first function on the first path. The server may determine (432) a second path score corresponding to the second path using a second fact credibility score associated with the second fact and a second function credibility score associated with a second function on the first path. The server may determine (434) that the first path score is greater than the second path score and may then determine dialog data to solicit a value corresponding to the first fact.

To build the portion of the DAG related to a particular function, the system may proceed as follows. First, the system may determine how the query relates to the DAG and may identify all the potential functions that may be used to respond to the query. The system may then identify all the leaves (e.g., facts) of the DAG that may be used by the identified functions. From there, the system may build a "tree" representing the various paths that may be traversed from the leaves across the functions to obtain the ultimate answer to the query. In the tree, the facts may be represented at the bottom, with the functions in the middle and the ultimate answer at the top. For example, FIG. 3A shows an example tree to answer the query of a healthy weight, FIG. 3B shows an example tree for dinner recipes with chicken, etc.

The different facts of the tree may be obtainable from different sources associated with different credibility scores. Thus the system may associate each fact with a particular respective credibility score. The fact credibility score may be associated with a likelihood that the fact is true. For example, if a user inputs the user's name, it may be associated with a high credibility score, but if a fact is obtained from a publicly editable website, a fact may be associated with a slightly lower credibility score. Various techniques may be used to determine fact credibility scores.

The functions that rely on the particular facts may themselves be associated with a credibility score. A function credibility score may be associated with a likelihood that the function, given the appropriate facts, gives you the right answer. For example, a function such as how old someone is may be associated with a high credibility (since age is a simple mathematical calculation) whereas a function such as how healthy someone is may be associated with a slightly lower credibility score since such a function may be inherently subjective. Note that the function credibility score may be independent of the fact credibility score.

Each function output credibility score, however, may be a combination of the fact credibility score and the function credibility score. That combination may be function credibility times fact credibility (although other techniques for determining a combined credibility may be used). For example, if an age determination function is associated with a perfect credibility (e.g., 1) the output credibility score from that function may also depend on the fact credibility score associated with the fact used to execute the function. For example, if an age function may obtain birth date information from a variety of different sources, the potential outputs from that function may depend on the credibility of those sources. If a user profile birth date has a certain credibility score (e.g., 0.90) whereas an official birth records source has a different credibility score (e.g., 0.95), the output of the age function may have a credibility of 0.90 (1×0.90) if the fact is obtained from the user profile or 0.95 (1×0.95) if the fact is obtained from the official birth records source.

To build the DAG portion, the system may determine credibility scores for the individual facts, credibility scores for the individual functions, and credibility scores for the outputs of the functions. For purposes of the building the tree, the credibility for the output of a function that may obtain facts from various sources may be determined to be the highest potential credibility. Thus, in the age example above, the system may assume the output of the age function has a credibility of 0.95 since the system may assume that the function will use the most credible facts available to it.

The system may thus build the credibility branches of the tree in an upward manner, starting at the leaves of the tree and going upward through the functions and the outputs until it arrives at the overall answer. The credibility of the overall answer may be a credibility score of the most credible function or combination of functions that can be traversed to arrive at the overall answer.

Figure 5:
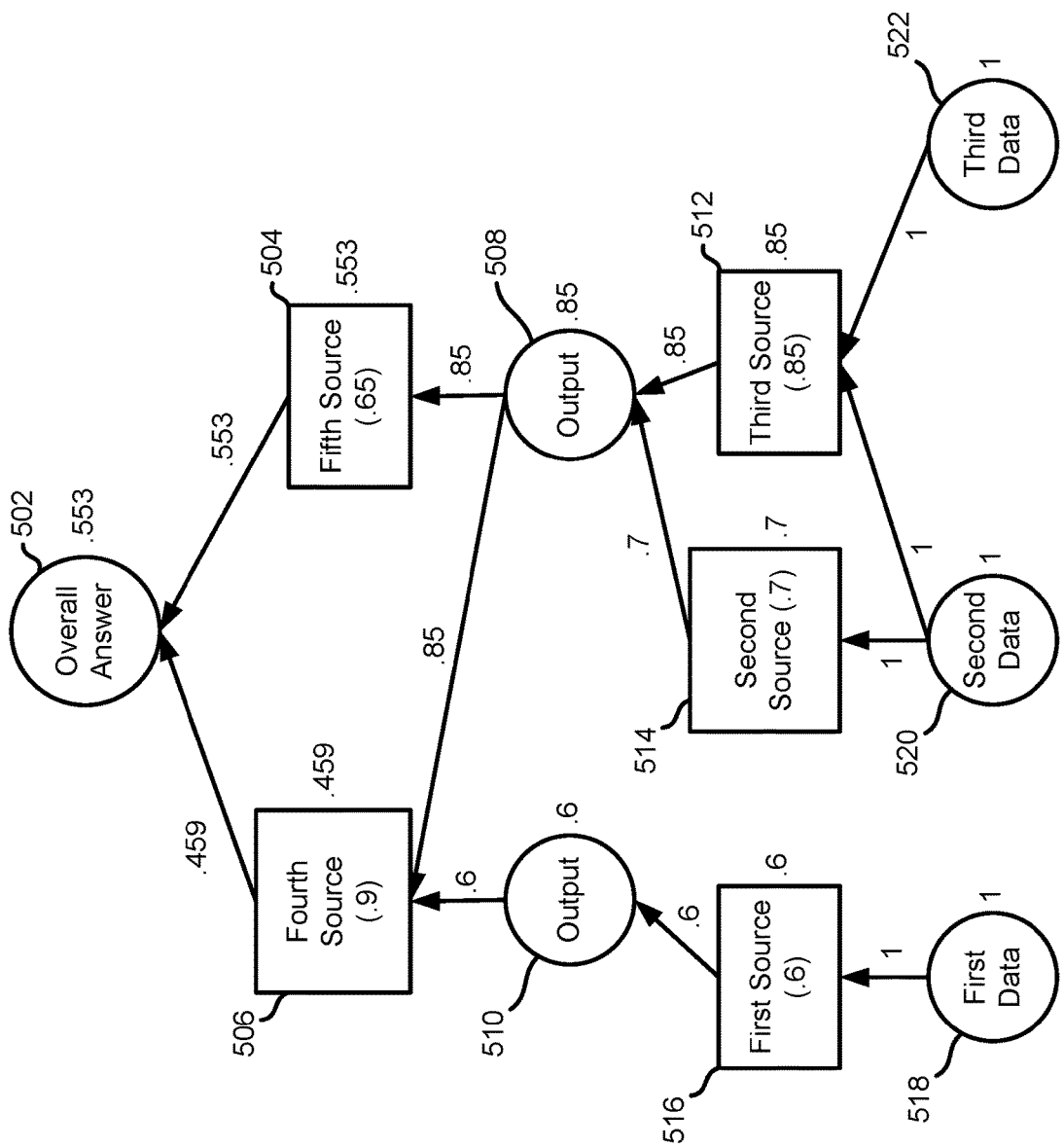
FIG. 5 illustrates the maximization of credibility of an answer to a spoken query based on data source credibility according to embodiments of the present disclosure.

For example, FIG. 5 illustrates an example DAG portion to be used when determining the credibility of an answer to a query according to the present disclosure. To build the DAG portion, the system may determine what leaves (e.g., 518, 520, and 522) correspond to the possible functions to obtain the overall answer 502. For example, if the user query corresponds to "am I healthy," the base attributes 518, 520, 522 may correspond to the user's weight, the user's height, and the user's gender. Thus, the base attributes that may (through one dialog path or another) yield the overall answer will form the tree of the DAG portion. Thus the leaves 518, 520, and 522 link to the terminal node 502, albeit indirectly. As shown in FIG. 5, leaf 518 directly links to first source 516, which directly links to output 510, which directly links to 506, which directly links to overall answer 502. Thus leaf 518 links to overall answer 502 along the following path 518→516→510→506→502.

In the example of FIG. 5, since the base attributes are providable by the user that provided the system 100 with the query, the base attributes may be considered 100% credible, and given a credibility score of 1 (although different credibilities may apply depending on the individual leaves).

As further illustrated in FIG. 5, three different functions 512, 514, 516 from different sources may operate on the base attributes 518, 520, 522 to determine two different outputs 508, 510. Moreover, each function 512, 514, 516 may be associated with a different credibility score (e.g., the first source of a function and/or stored data may have a credibility score of 0.6, the second source of a function and/or stored data may have a credibility score of 0.7, and the third source of may have a credibility score of 0.85). To build the tree and determine a credibility of the output 510, the system 100 goes from the bottom of the tree upward, and multiplies the credibility of the base attribute 518 by the credibility of the first source 516. In doing so, the system forms different paths from the leaves to the overall answer. As these paths may correspond to information the system may need to obtain from a user, they, or portions of them, may also be referred to as dialogs or dialog paths. To determine a credibility of an output of a function, the system may multiply the credibility of the function by the credibility of the fact(s) that the function operates on.

For example, to determine the credibility of output 510, the system multiplies the credibility (0.6) of the first source function 516 by the credibility (1) of the data 518 upon which the first function relies. To determine the credibility of an a function that relies on multiple facts, the system may multiply the credibility of the function by the credibilities of all the underlying facts. For example, if a function has a credibility of $C_{function}$, and relies on N facts with their credibilities being $C_{fact1}$, $C_{fact2}$, . . . $C_{factN}$, then the credibility of the output of the function will be $C_{output} = C_{function} * C_{fact1} * C_{fact2} * C_{factN}$. Thus, for example, the credibility of the output of third source function 512 will be its credibility (0.85) times the credibility of the two facts 520 and 522 that the third source function relies on (1 and 1 respectively). Thus the output of the third source function 512 will have a credibility of 0.85. If, however, the second data 520 had a credibility of 0.95 and the third data 522 had a credibility of 0.90, the credibility of the output of the third source 512 would be 0.72675 (i.e., 0.85*0.95*0.9).

To determine the credibility of an output that may be obtained by two or more different functions, such as the output 508 that may be obtained either by the second source function 514 or the third source function 512, the system 100 may choose the highest credibility of the available functions to the output as the output's credibility. This is due to the system, when answering a query, will choose the highest credibility path to an answer, therefore will take the highest credibility to an output, thus ignoring the lower credibility path to the output. Thus, in the example of output 508 where the output of second source 514 has a credibility of 0.7 (as a result of the credibility of the second source function 0.7 times the credibility of second data 520 1 being 0.7) and the output of third source 512 has a credibility of 0.85 (as explained above) the output 508 will have a credibility score of 0.85 as that represents the credibility of the most credible path to output 508. Thus, the path score from second and third data up to output 508 is 0.85.

As additionally illustrated in FIG. 5, the outputs 508, 510 may be used with fourth source 506 and/or fifth source 504 to determine the overall answer to the user's query. In one instance, the system 100 may multiply the credibility of the output 510, the credibility of the output 508, and the credibility of the fourth source 506 to determine an answer output from fourth source function 506 having a credibility of 0.459. In another instance, the system 100 may multiple the credibility of the output 508 by the credibility of the fifth source 504 to determine an answer output from the fifth source function having a credibility of 0.553. Given the choice between the two the system will choose the most credible path, thus giving overall answer 502 a credibility score of 0.553, the path represented by the output of the fifth source function 504. Thus, the path from overall answer 502 all the way down to second data 520 and third data 522 may correspond to a path score of 0.553.

Once the bottom up credibility determinations described above with respect to FIG. 5 are completed, the system 100 may perform a top down process to determine the dialog path that will produce the most credible answer to the user query. To do so, the system will start at the "top" of the tree and will go down, selecting at each junction the most credible branch. According to the example of FIG. 5, the system 100 would, in the first instance, choose the branch with 0.553 credibility over the branch with 0.459 credibility. The system will then continue downward (through the fifth source 504 and to the output 508) until the next decision point. Then, now at 508, the system 100 would choose the path with 0.85 credibility over the path with 0.7 credibility, which would take the system to box 512. That box relies on leaves 520 and 522, thus resulting in the system choosing the path from leaves 520 and 522 to the overall answer 502. The system may then select this path as the most credibly path and may thus prepare a dialog with the user to prompt the user for the base attributes 520, 522.

Data of a particular source of a function or stored data may be comprised of data from multiple data sources. For example, a single source of stored data may include data from one or more peer reviewed journals, one or more homeopathic remedy catalogs, a professional blog, a med student produced blog, etc. As such, it should be appreciated that more "professional" sources may be given higher credibility scores. This higher score represents likelihood that a function of a source (e.g., 512, 514, 516, 504, or 506) may be more credible in determining an output of the particular function (e.g., output 510 based on function 516, output 508 based on function 514 or output 508 based on function 512) than other functions.

Figure 6A:
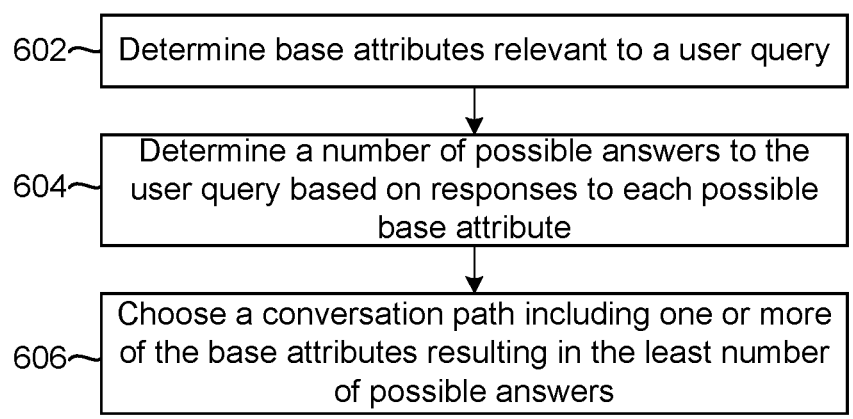
FIG. 6A is a process flow diagram illustrating a method for performing a computer-based dialog based on conversation entropy according to embodiments of the present disclosure.

FIG. 6A illustrates a method for performing a computer-based dialog based on conversation entropy. In general, the system 100 may be configured to choose a dialog path that has the least amount of possible answers to a user query. The system 100 may determine (602) base attributes relevant to a user query. The system 100 may also determine (604) a number of possible answers to the user query based on responses to each base attribute. The system 100 may then choose (606) a dialog path including one or more of the base attributes that result in the least number of possible answers. The system may determine dialog data (e.g., question or prompt text corresponding to the dialog path, potential further questions or prompts along the dialog path, or other data related to obtaining information from the user using the dialog path).

Referring again to the example DAG portion of FIG. 3A, a input query of whether a user has a healthy weight may be answered by the system either by obtaining information about the user's waistline and gender or by obtaining information about the user's BMI (which in turn is reliant upon the user's height and weight). If the system determines that one particular fact, if given in a certain way, may more quickly obtain an answer to the user query (thus reducing the entropy of any dialog needed to respond to the query) the system may select a question designed to elicit that fact from a user. For example, if the system determines that a question asking the user's weight has a distribution of possible answers where the probability of certain answers may lead directly to an answer of the query (e.g., an answer of the user weighing 800 pounds will likely lead to an answer to the user's query without additional dialog), the system may select a question designed to elicit the user's weight as the first dialog question. The system may thus determine probabilities of receiving different answers to dialog questions, may determine how each potential answer may lead more or less directly to the answer of the user query, and may score potential questions using that information. The score may represent the entropy of the particular question.

Figure 6B:
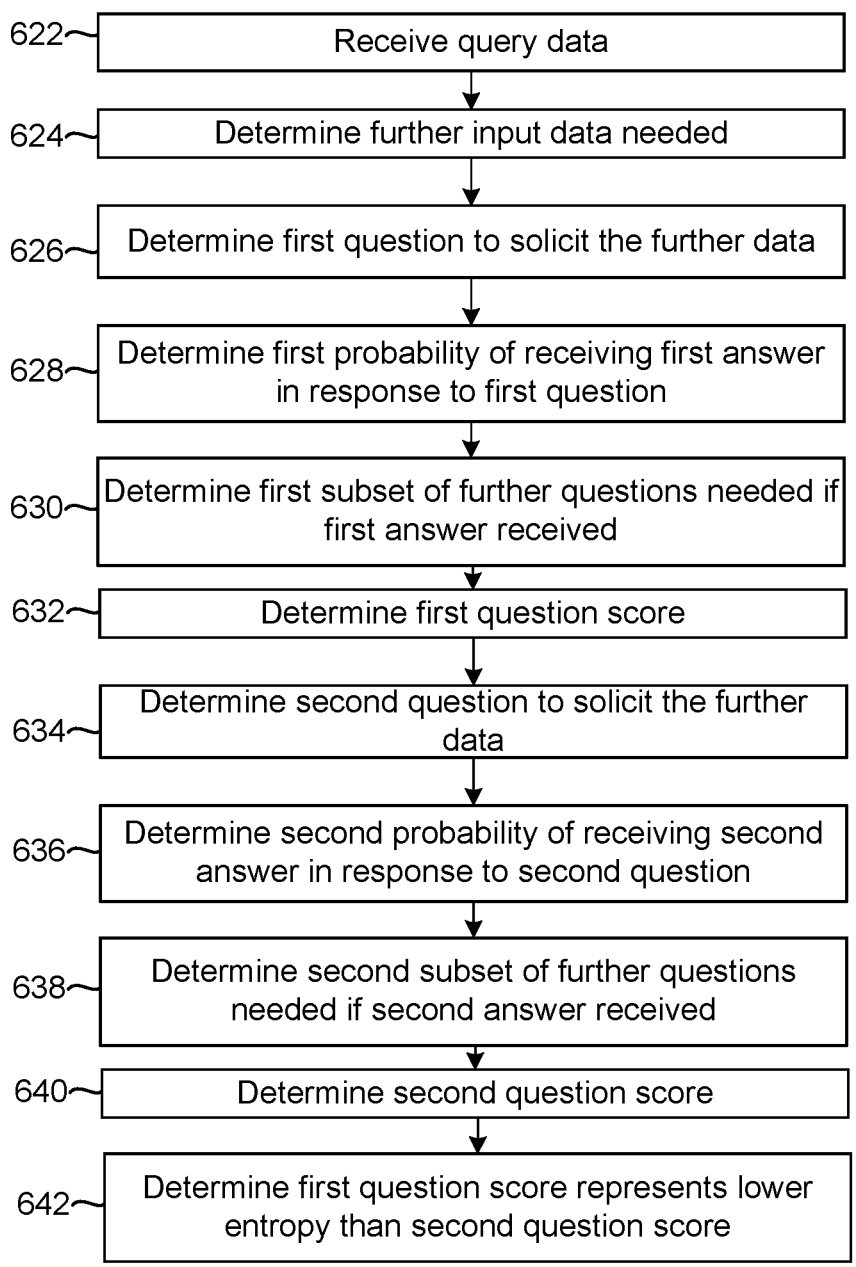
FIG. 6B is a process flow diagram illustrating a method for performing a computer-based dialog based on conversation entropy according to embodiments of the present disclosure.

FIG. 6B illustrates selecting a question for a computer-based dialog based on conversation entropy. As shown in FIG. 6B, a server(s) 120 may receive (622) query data. The server 120 may determine (624) further input data is needed to respond to the query. The server 120 may determine (626) a first question to solicit an answer corresponding to the further input data. The server 120 may determine (628) a first probability of receiving a first potential answer in response to the first question. The server 120 may determine (630) a first subset of further questions needed to obtain the further input data in response to receipt of the first potential answer. The server 120 may determine (632) a first question score corresponding to the first question using the first probability and the first subset. The server 120 may determine (634) a second question to solicit an answer corresponding to the further input data. The server 120 may determine (636) a second probability of receiving a second potential answer in response to the second question. The server 120 may determine (638) a second subset of further questions needed to obtain the further input data in response to receipt of the second potential answer. The server 120 may determine (640) a second question score corresponding to the second question using the second probability and the second subset. The server 120 may determine (642) that the first question score corresponds to a likelihood of fewer further questions than the second question score, thus representing a lower entropy than the second question score. The server 120 may then select the first question to send to a user.

As known in the art, entropy may be expressed as the expected value of information contained in each question. To determine how to obtained desired information with the appropriate number of questions in a dialog the system may calculate the entropy of particular questions and likely answers to select questions for a dialog that will result in the desired entropy. For example, the system may calculate the potential entropy of a particular question to be answered by analyzing the number of possible answers to a question, the probability of each respective possible answer, and the number of questions that may follow each possible answer. For example, if an incoming query is received, the system may determine there is data it needs to answer the query. The system can determine what questions to answer to obtain that data and can measure the entropy of those questions by multiplying the probability of receiving a potential answer by its expected entropy (which may represent how further questions may be needed to answer the query if given the potential answer in response to the first question). The system may use an equation to calculate the expected value of a random variable (e.g., multiplying the value of a potential answer by its probability of occurring and then summing those values for all potential answers). To reduce the entropy, the system may be configured to select its next dialog question as the question that is most likely to reduce the entropy, meaning the question that is most likely to lead to an answer that reduces the number of exchanges in the dialog between the system and the user. Decreasing conversation entropy narrows a probability distribution of possible answers to a user query. As conversation entropy decreases, the possible answers to the user query decreases. Moreover, as conversation entropy decreases, in answer confidence may increase. In reducing entropy, the system may thus select a question as part of its dialog that reduces the distribution of possible answers and further questions.

FIG. 7 illustrates how data needed to answer the NLU results is determined (illustrated as 828). Put another way, FIG. 7 illustrates how a dialog path may be determined. The server(s) 120 determines (702) one or more paths that may be used to determine an answer using data stored by the system. The server(s) 120 also determines (704) the credibility of an answer resulting from each path. The server(s) 120 additionally determines (706) the entropy involved with each path. For example, one path may not involve prompting the user for additional data (i.e., the system has all the data needed to answer the query), another path may include prompting the user for additional data a single time, another path may include prompting the user for additional data more than once, etc.

The server(s) 120 may determine (708) to use the path resulting in an answer with the highest credibility. Alternatively, the server(s) 120 may determine (710) to use the path having the lowest entropy (i.e., involving the least amount of user prompts soliciting additional data). The server(s) 120 may also determine (712) to use a path based on both answer credibility and conversation entropy. For example, the server(s) 120 may choose a path involving more entropy if the user prefers such. In addition, the server(s) 120 may choose a path having a lower credibility if the path has a low conversation entropy. Other configurations are also possible.

Figure 8A:
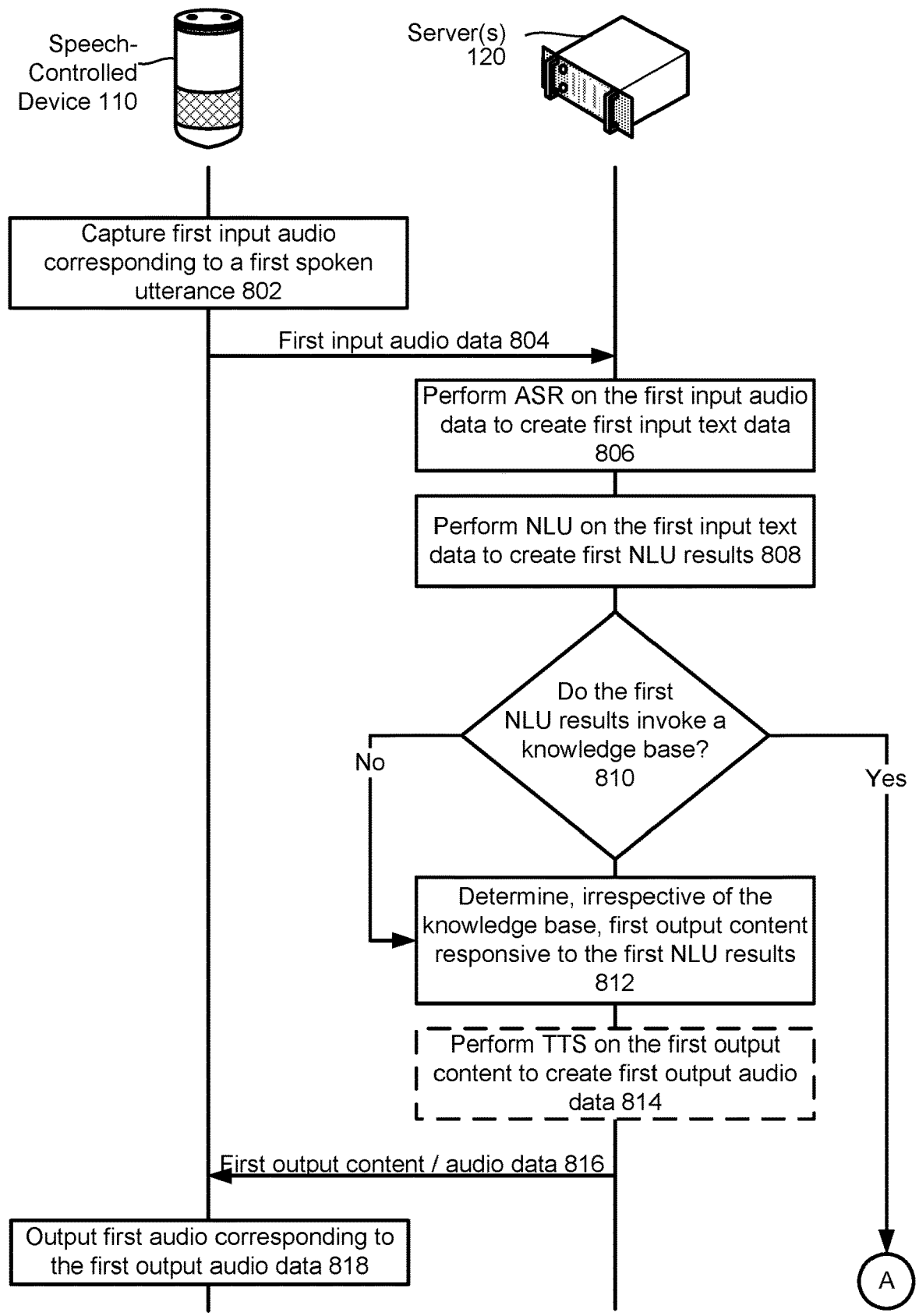
Figure 8C:
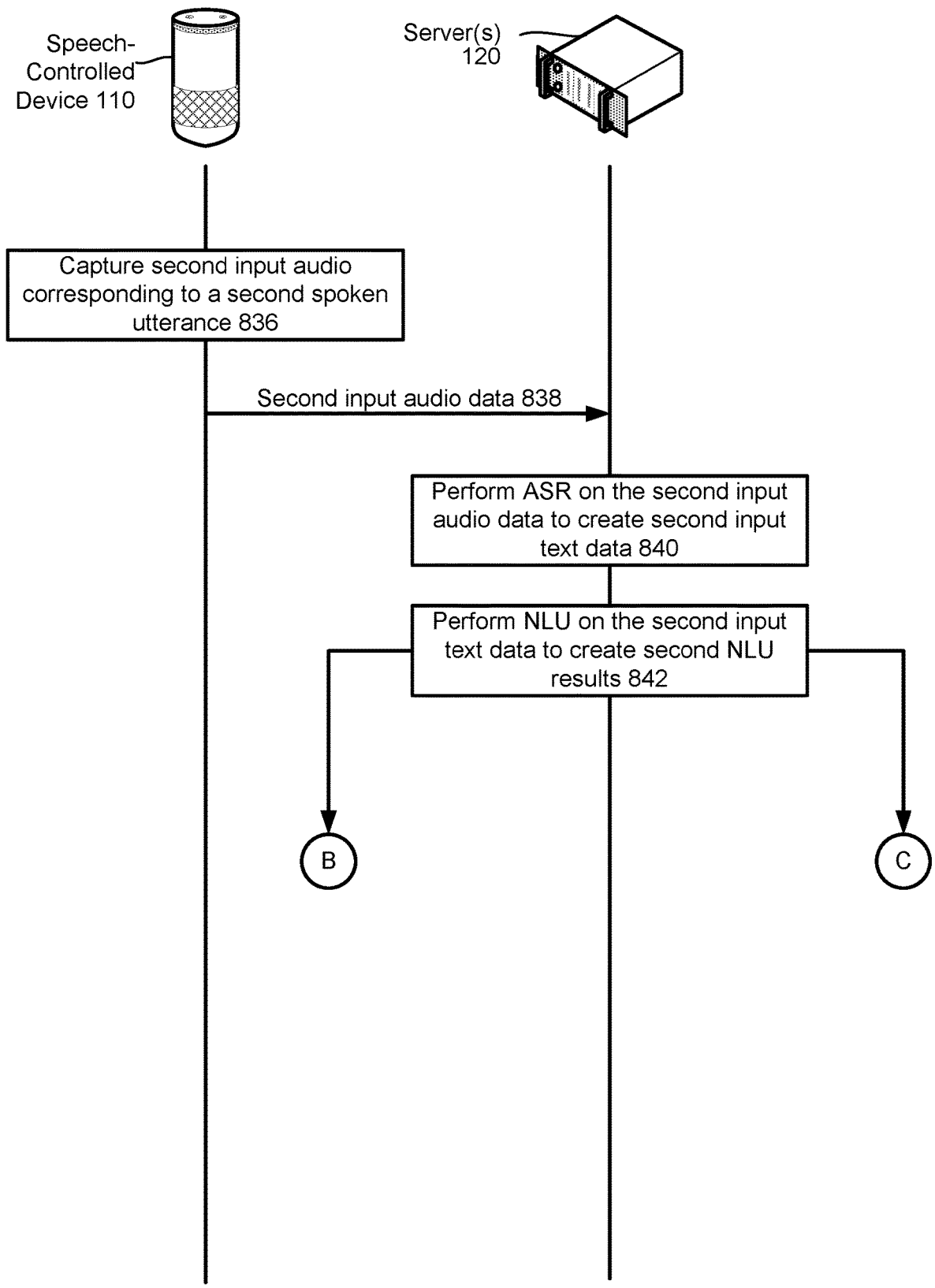

FIGS. 8A through 8C illustrate the system determining an answer to a spoken query based on credibility maximization and conversation entropy minimization. The speech-controlled device 110 captures (802) input audio corresponding to a spoken utterance, and sends (804) input audio data corresponding to at least the spoken utterance to the server(s) 120.

The server(s) 120 performs (806) ASR on the input audio data to create input text data, and performs (808) NLU on the input text data to create NLU results. The server(s) 120 determines (810) whether the NLU results invoke the knowledge base of data from various sources. If the NLU results do not invoke the knowledge base, the server(s) 120 determines (812), irrespective of the knowledge base, output content responsive to the NLU results. Such output content may be music data, search results text data, video data, or the like. If the output content is text data, the server(s) 120 performs (814) TTS on the text data to create output audio data. The server(s) 120 sends (816) the output content or the output audio data to the speech-controlled device 110 (or another device indicated in a profile of the user). The speech-controlled device 110 (or other device) outputs (818) the content, or audio corresponding to the output audio data.

If the NLU results invoke the knowledge base, the server(s) 120 determines (820) whether an answer to the NLU results can be determined based on data stored in the user's profile and data stored in the knowledge base. If an answer to the NLU results can be determined, the server(s) 120 determines (822) output audio data corresponding to the answer to the NLU results. The server(s) may determine the output audio data by determining output text data based on the data of the knowledge base and user profile, and may perform TTS on the output text data to create the output audio data. The server(s) 120 may send (824) the output audio data to the speech-controlled device 110 (or other device), and the speech-controlled device 110 (or other device) may output (826) the output audio data.

If an answer to the NLU results cannot be determined based on data stored in the user's profile and the knowledge base, the server(s) 120 may determine (828) data needed to determine the answer. The server(s) 120 may determine the data needed using the credibility maximization and conversation entropy optimization techniques discussed herein above. For example, the server(s) 120 may determine all possible data that may be used to determine the answer, and may determine the data in the knowledge base usable in conjunction with the needed data to determine the answer. The server(s) 120 may then map possible dialog paths in view of the needed data, the usable data in the knowledge base, and the credibility associated with each portion of the usable data. This mapping is illustrated in FIGS. 6A and 6B discussed above. The server(s) 120 then determines the data needed based on the mapping, credibility maximization, and conversation entropy minimization.

The server(s) 120 creates (830) output audio data soliciting the needed data, and sends (832) the output audio data to the speech-controlled device 110 (or other device). The speech-controlled device 110 (or other device) outputs (834) audio corresponding to the output audio data. Thereafter, the speech-controlled device 110 (or other device) captures (836) input audio corresponding to a spoken utterance, and sends (838) input audio data corresponding at least to the spoken utterance to the server(s) 120.

The server(s) 120 performs (840) ASR on the input audio data to create input text data, and performs (842) NLU on the input text data to create NLU results. If the server(s) 120 determines, at step (820) that multiple pieces of data is not stored in the user profile and is thus needed from the user, the server(s) 120 may repeat steps (828) through (842) for each portion of data needed, until all data is known to the server(s) 120. Alternatively, the output audio data created at step (830) may solicit data corresponding to each portion of date needed from the user. This would allow the user to speak all the data needed at a single time, thereby decreasing the conversation entropy. Once the server(s) 120 has all the data needed to answer the spoken query, the server(s) 120 determines (822) output audio data corresponding to the answer, and sends (824) the output audio data to the speech-controlled device 110 (or other device), which outputs (826) audio corresponding to the answer to the initial spoken utterance.

FIG. 9 is a conceptual diagram of how a spoken utterance is processed. The various components illustrated may be located on a same or different physical devices. Communication between various components illustrated in FIG. 9 may occur directly or across a network(s) 199. An audio capture component, such as the microphone 103 of the speech-controlled device 110 (or other device), captures input audio 11 corresponding to a spoken utterance. The device 110, using a wakeword detection component 920, then processes the audio, or audio data corresponding to the audio, to determine if a keyword (such as a wakeword) is detected in the audio. Following detection of a wakeword, the speech-controlled device 110 sends audio data 111, corresponding to the input audio 11, to a server(s) 120 that includes an ASR component 950. The audio data 111 may be output from an acoustic front end (AFE) 956 located on the speech-controlled device 110 prior to transmission. Alternatively, the audio data 111 may be in a different form for processing by a remote AFE 956, such as the AFE 956 located with the ASR component 950.

The wakeword detection component 920 works in conjunction with other components of the speech-controlled device 110, for example the microphone 103 to detect keywords in audio 11. For example, the speech-controlled device 110 may convert audio 11 into audio data, and process the audio data with the wakeword detection component 920 to determine whether speech is detected, and if so, if the audio data comprising speech matches an audio signature and/or model corresponding to a particular keyword.

The speech-controlled device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the speech-controlled device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio captured by the speech-controlled device 110, the speech-controlled device 110 may use the wakeword detection component 920 to perform wakeword detection to determine when a user intends to speak a query to the speech-controlled device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 920 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the speech-controlled device 110 may "wake" and begin transmitting audio data 111 corresponding to input audio 11 to the server(s) 120 for speech processing. The audio data 111 may be sent to the server(s) 120 for routing to a recipient device or may be sent to the server(s) 120 for speech processing for interpretation of the included speech (either for purposes of enabling voice-communications and/or for purposes of executing a command in the speech). The audio data 111 may include data corresponding to the wakeword, or the portion of the audio data 111 corresponding to the wakeword may be removed by the speech-controlled device 110 prior to sending.

Upon receipt by the server(s) 120, an ASR component 950 may convert the audio data 111 into text data. The ASR component 950 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 954 stored in an ASR model knowledge base (i.e., ASR model storage 952). For example, the ASR component 950 may compare the audio data 111 with models for sounds (e.g., subword units, phonemes, etc.) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 953 stored in the ASR model storage 952), and a likelihood that a particular word that matches the sound would be included in the sentence at the specific location (e.g., using a language model 954 stored in the ASR model storage 952). Thus, each potential textual interpretation of the spoken utterance (i.e., hypothesis) is associated with a confidence score. Based on the considered factors and the assigned confidence score, the ASR component 950 outputs the most likely text recognized in the audio data 111. The ASR component 950 may also output multiple hypotheses in the form of a lattice or an N-best list with each hypothesis corresponding to a confidence score or other score (e.g., such as probability scores, etc.).

The device or devices including the ASR component 950 may include an AFE 956 and a speech recognition engine 958. The AFE 956 transforms the audio data 111 into data for processing by the speech recognition engine 958. The speech recognition engine 958 compares the speech recognition data with acoustic models 953, language models 954, and other data models and information for recognizing the speech conveyed in the audio data 111. The AFE 956 may reduce noise in the audio data 111 and divide the digitized audio data 111 into frames representing time intervals for which the AFE 956 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio that may be useful for ASR processing. A number of approaches may be used by the AFE 956 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 958 may process data output from the AFE 956 with reference to information stored in the ASR model storage 952. Alternatively, post front-end processed data (e.g., feature vectors) may be received by the device executing ASR processing from another source besides the internal AFE 956. For example, the speech-controlled device 110 may process audio data 111 into feature vectors (e.g., using an on-device AFE 956) and transmit that information to the server(s) 120 across the network(s) 199 for ASR processing. Feature vectors may arrive at the server(s) 120 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 950 will output speech results that make sense grammatically.

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server(s) 120, or by another device (e.g., a server running a search engine, etc.)

The device performing NLU processing (e.g., the server(s) 120) may include various components, including potentially dedicated processor(s), memory, storage, etc. The device performing NLU processing may include a dedicated NLU component/component 960, which may include a named entity recognition (NER) component 962, and intent classification (IC) component 964. The device performing NLU processing may additionally include NLU storage 973, and a knowledge base (not illustrated). The knowledge base is a database or other information storage that may include information about entities that may be used in resolving spoken utterances. The NLU component 960 may also utilize gazetteer information 984a-984n stored in an entity library storage 982. The knowledge base and/or gazetteer information 984a-984n may be used for entity resolution, for example matching ASR results with different entities (e.g., song titles, contact names, etc.). Gazetteers 984a-984n may be linked to users (e.g., a particular gazetteer may be associated with a specific user's music collection), may be linked to certain domains (e.g., shopping), or may be organized in a variety of other ways.

The NLU component 960 takes text data (e.g., output from the ASR component 950 based on the spoken utterance/input audio 11) and attempts to make a semantic interpretation of the text data. That is, the NLU component 960 determines the meaning behind the text data based on the individual words and then implements that meaning. The NLU component 960 interprets a text string to derive an intent or a desired action from the user as well as the pertinent pieces of information in the text data that allow a device (e.g., the speech-controlled device 110, the server(s) 120, etc.) to complete that action. For example, if a spoken utterance is processed using the ASR component 950, which outputs the text data "call mom", the NLU component 960 may determine the user intended to activate a telephone in his/her device and to initiate a call with a contact matching the entity "mom."

The NLU component 960 may process several textual inputs related to the same utterance. For example, if the ASR component 950 outputs N text segments (e.g., as part of an N-best list), the NLU component 960 may process all N outputs to obtain NLU results.

As will be discussed further below, the NLU component 960 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU component 960 may be configured to determine a "domain" of the utterance so as to determine and narrow down which services offered by an endpoint device (e.g., the server(s) 120, or the speech-controlled device 110) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER component 962 receives an utterance in the form of ASR results and attempts to identify relevant grammars and lexical information that may be used to construe meaning. To do so, the NER component 962 may begin by identifying potential domains that may relate to the received utterance. The NLU storage 973 includes a database of domains 974a-974n associated with specific devices. For example, the speech-controlled device 110 may be associated with domains for music, telephony, calendaring, contact lists, and device-specific communications. In addition, the entity library 982 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 976a-976n, a particular set of intents/actions 978a-978n, and/or a particular personalized lexicon 986. Each gazetteer 984a-984n may include domain-indexed lexical information associated with a particular user and/or device. For example, the Gazetteer A 984a includes domain-index lexical information 986aa to 986an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored (as discussed further below), with the overall highest ranked result from all applied domains being ordinarily selected to be the correct result.

An IC component 964 parses the utterance to determine an intent(s) for each identified domain, where the intent(s) corresponds to the action to be performed that is responsive to the spoken utterance. Each domain is associated with a database 978a-978n of words linked to intents. For example, a music intent database may link words and phrases such as "quiet," "volume off," and "mute" to a "mute" intent. The IC component 964 identifies potential intents for each identified domain by comparing words in the utterance to the words and phrases in the intents database 978.

In order to generate a particular interpreted response, the NER component 962 applies the grammar models and lexical information associated with the respective domain. Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model 976 associated with a shopping domain may include a database of words commonly used when people discuss shopping.

The intents identified by the IC component 964 are linked to domain-specific grammar frameworks (included in 976) with "slots" or "fields" to be filled. For example, if "play music" is an identified intent, a grammar 976 framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 962 may parse the spoken utterance to identify words as subject, object, verb, preposition, etc., based on grammar rules and models, prior to recognizing named entities. The identified verb may be used by the IC component 964 to identify intent, which is then used by the NER component 962 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 962 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 962 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 964 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 962 may search the database of generic words associated with the domain (i.e., in the NLU storage 973). For instance, if the utterance was "play songs by the rolling stones," after failing to determine an album name or song name called "songs" by "the rolling stones," the NER component 962 may search the domain vocabulary for the word "songs." In the alternative, generic words may be checked before the gazetteer information, or both may be tried, potentially producing two different results.

The comparison process used by the NER component 962 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER component 962 may also use contextual operational rules to fill slots. For example, if a user had previously requested to pause a particular song and thereafter requested that the speech-controlled device 110 "please un-pause my music," the NER component 962 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing, which may include tagged text data, commands, etc., may then be sent to a command processor 990, which may be located on a same or separate server(s) 120 as part of the system 100. The system 100 may include more than one command processor 990, and the command processor(s) 990 may be determined based on the NLU output. For example, if the NLU output includes a command to play music, the command processor(s) 990 selected may be a music playing application, such as one located on the speech-controlled device 110 or in a music playing appliance, configured to execute a music playing command. If the NLU output includes a search utterance (e.g., requesting the return of search results), the command processor(s) 990 selected may include a search engine processor, such as one located on a search server, configured to execute a search query and determine search results, which may include output text data to be processed by a TTS engine and output from a device as synthesized speech.

Further, the ASR component 950 may output ASR confidence score data for further processing by a user recognition component 995. The user recognition component 995 identifies a user (i.e., determines an identity of a user) as well as verifies the user (i.e., confirms that the identified user is correct). The user recognition component 995 performs user recognition using the audio data 111, and optionally the ASR component output. The user recognition component 995 may additionally perform user recognition using facial recognition techniques, biometric analysis, or the like. The user recognition component 995 may include a scoring component that determines respective scores indicating whether the input utterance in the audio data 111 was spoken by particular users. The user recognition component 995 may also include a confidence component that determines an overall confidence as the accuracy of user recognition operations. Output of the user recognition component 995 may be provided to the command processor 990.

A TTS component 1014 may receive tagged text data from the command processor(s) 990, so the TTS component 1014 may synthesize speech corresponding to the text data. Speech may be synthesized by the TTS component 1014 as described below with respect to FIG. 10.

The TTS component 1014 includes a TTS front end (TTSFE) 1016, a speech synthesis engine 1018, and a TTS storage 1020. The TTSFE 1016 transforms input text data (e.g., from the command processor(s) 990) into a symbolic linguistic representation for processing by the speech synthesis engine 1018. The TTSFE 1016 may also process tags or other data input to the TTS component 1014 that indicate how specific words should be pronounced. The speech synthesis engine 1018 compares the annotated phonetic units and information stored in the TTS storage 1020 for converting the input text data into speech (i.e., audio data). The TTSFE 1016 and the speech synthesis engine 1018 may include their own controller(s)/processor(s) and memory, or they may use the controller(s)/processor(s) and memory of the server(s) 120, the speech-controlled device 110, or another device, for example. Similarly, the instructions for operating the TTSFE 1016 and the speech synthesis engine 1018 may be located within the TTS component 1014, within the memory and/or storage of the server(s) 120, the speech-controlled device 110, or within an external device.

Text data input into the TTS component 1014 may be sent to the TTSFE 1016 for processing. The TTSFE 1016 may include components for performing text normalization, linguistic analysis, and linguistic prosody generation. During text normalization, the TTSFE 1016 processes the input text data and generates standard/normalized text data, converting such things as numbers, abbreviations (e.g., Apt., St., etc.), and symbols ($, %, etc.) into the equivalent of written out words.

During linguistic analysis, the TTSFE 1016 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 1014 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 1020. The linguistic analysis performed by the TTSFE 1016 may also identify different grammatical components such as prefixes, suffixes, phrases, punctuation, syntactic boundaries, or the like. Such grammatical components may be used by the TTS component 1014 to craft a natural sounding audio waveform output. The language dictionary may also include letter-to-sound rules and other tools that may be used to pronounce previously unidentified words or letter combinations that may be encountered by the TTS component 1014. Generally, the more information included in the language dictionary, the higher quality the speech output.

Based on the linguistic analysis, the TTSFE 1016 may then perform linguistic prosody generation where the phonetic units are annotated with desired prosodic characteristics, also called acoustic features, which indicate how the desired phonetic units are to be pronounced in the eventual output speech. During this stage, the TTSFE 1016 may consider and incorporate any prosodic annotations that accompanied the text data input to the TTS component 1014. Such acoustic features may include pitch, energy, duration, and the like. Application of acoustic features may be based on prosodic models available to the TTS component 1014. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 1016, referred to as a symbolic linguistic representation, may include a sequence of phonetic units annotated with prosodic characteristics. This symbolic linguistic representation may be sent to the speech synthesis engine 1018, also known as a synthesizer, for conversion into an audio waveform of speech for output to an audio output device and eventually to a user. The speech synthesis engine 1018 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 1018 may perform speech synthesis using one or more different methods. In one method of synthesis called unit selection, a unit selection engine 1030 matches the symbolic linguistic representation created by the TTSFE 1016 against a database of recorded speech, such as a database of a voice corpus. The unit selection engine 1030 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 1030 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 1032, a digital signal processor, or other audio generation device to create an artificial speech waveform output. Parametric synthesis uses a computerized voice generator, sometimes called a vocoder.

Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 1014 may include an acoustic model, or other models, which may convert a symbolic linguistic representation into a synthetic acoustic waveform of the input text data based on audio signal manipulation. The acoustic model includes rules which may be used by the parametric synthesis engine 1032 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 1016.

The parametric synthesis engine 1032 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to the parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 1018, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 1078a-1078n (stored in TTS voice unit storage 1072), where each unit database is configured with a different "voice." Such voice inventories may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match a desired speech quality. The customized voice inventory 1078 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 1014 may synthesize speech as normal, but the system 100, either as part of the TTS component 1014 or otherwise, may apply a filter to make the synthesized speech take on the desired speech quality. In this manner a traditional TTS output may be altered to take on the desired speech quality.

During runtime the TTS component 1014 may receive text data for speech synthesis along with an indicator for a desired speech quality of the output speech. The TTS component 1014 may then select a voice matching the speech quality, either for unit selection or parametric synthesis, and synthesize speech using the received text data and speech quality indicator.

Figure 11:
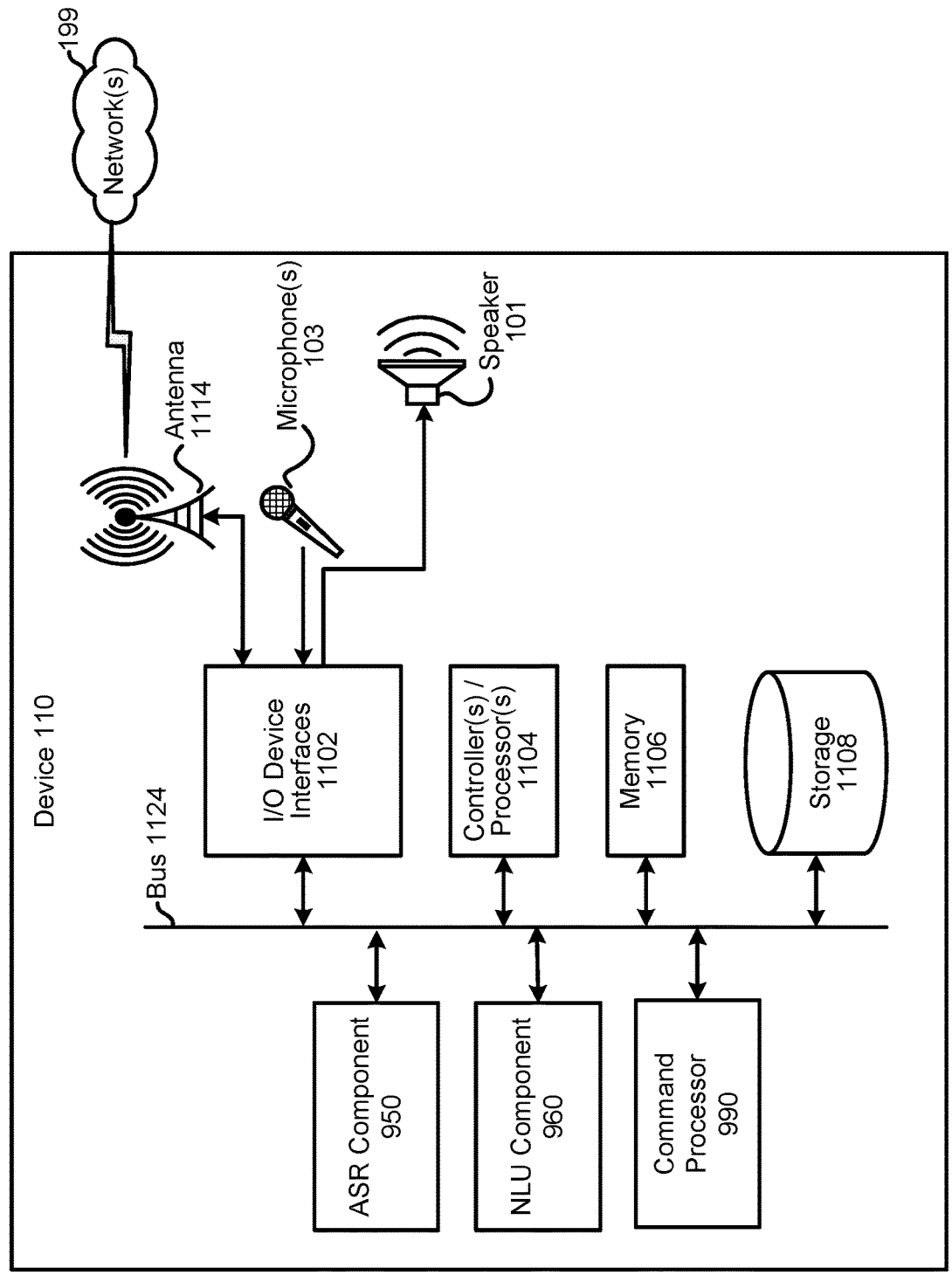
FIG. 11 is a block diagram conceptually illustrating example components of a device according to embodiments of the present disclosure.
Figure 12:
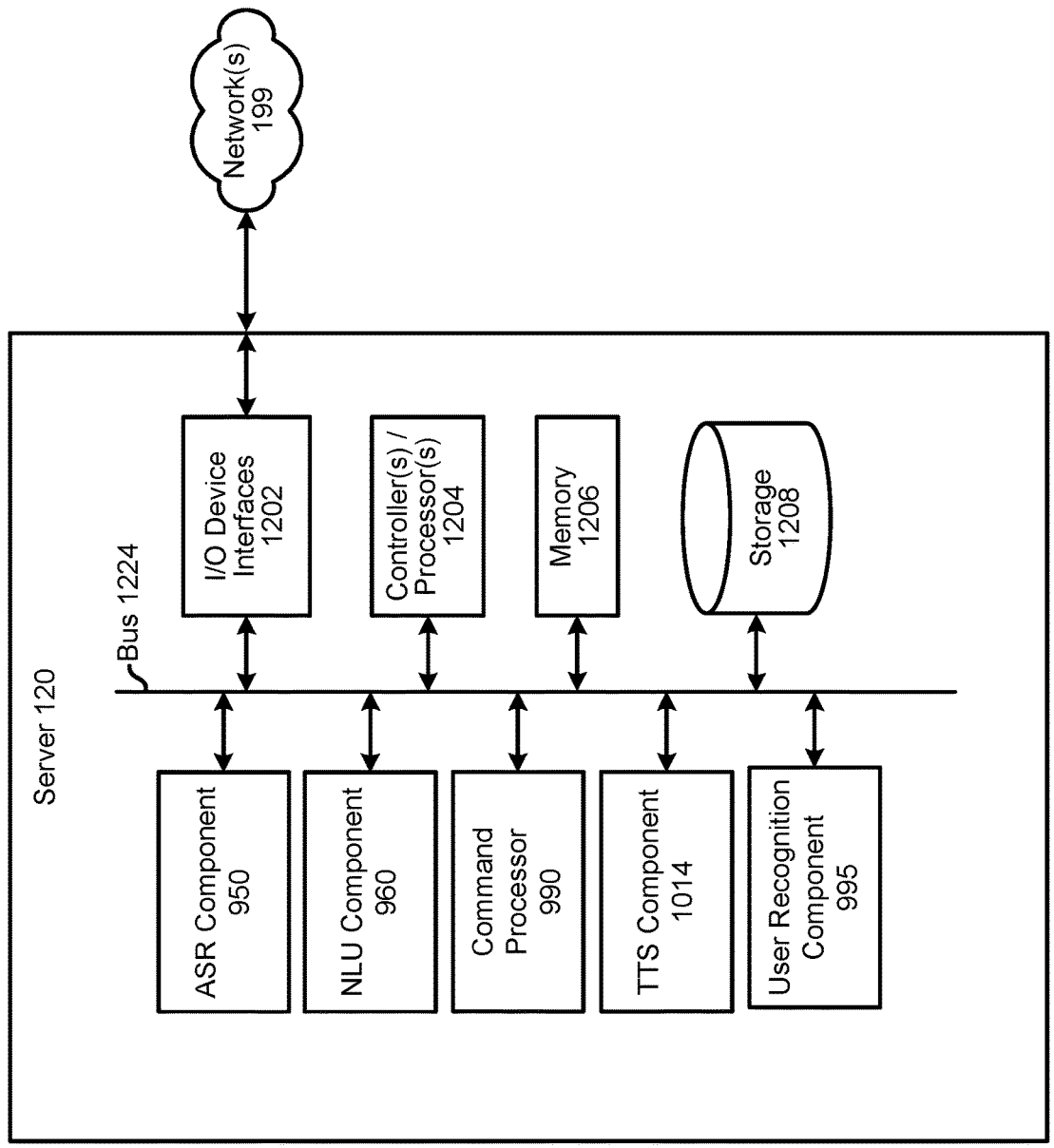
FIG. 12 is a block diagram conceptually illustrating example components of a server according to embodiments of the present disclosure.

FIG. 11 is a block diagram conceptually illustrating a user device (e.g., the speech-controlled device 110) that may be used with the described system. FIG. 12 is a block diagram conceptually illustrating example components of a remote device, such as the server(s) 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1104/1204), that may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive (MRAM) and/or other types of memory. Each device (110/120) may also include a data storage component (1108/1208), for storing data and controller/processor-executable instructions. Each data storage component (1108/1208) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1102/1202).

Computer instructions for operating each device (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120) includes input/output device interfaces (1102/1202). A variety of components may be connected through the input/output device interfaces (1102/1202), as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 101, a wired headset or a wireless headset (not illustrated), or other component capable of outputting audio. The device 110 may also include an audio capture component. The audio capture component may be, for example, a microphone 103 or array of microphones, a wired headset or a wireless headset (not illustrated), etc. If an array of microphones is included, approximate distance to a sound's point of origin may be determined by acoustic localization based on time and amplitude differences between sounds captured by different microphones of the array.

For example, via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the system 100 may be distributed across a networked environment.

The device 110 and/or the server 120 may include an ASR component 950. The ASR component 950 in the device 110 may be of limited or extended capabilities. The ASR component 950 may include the language models 954 stored in ASR model storage component 952. If limited speech recognition is included, the ASR component 950 may be configured to identify a limited number of words, whereas extended speech recognition may be configured to recognize a much larger range of words.

The device 110 and/or the server 120 may include a limited or extended NLU component 960. The NLU component 960 in the device 110 may be of limited or extended capabilities. The NLU component 960 may comprise the name entity recognition component 962, the intent classification component 964, and/or other components. The NLU component 960 may also include a stored knowledge base and/or entity library, or those storages may be separately located.

The device 110 and/or the server 120 may also include the command processor 990 configured to execute commands/functions associated with a spoken utterance as described herein.

To determine the user that spoke a command/utterance, the server(s) 120 may be configured with the user recognition component 995 described in detail herein above.

To create output speech, the server(s) 120 may be configured with the TTS component 1014 described in detail herein above.

Figure 10:
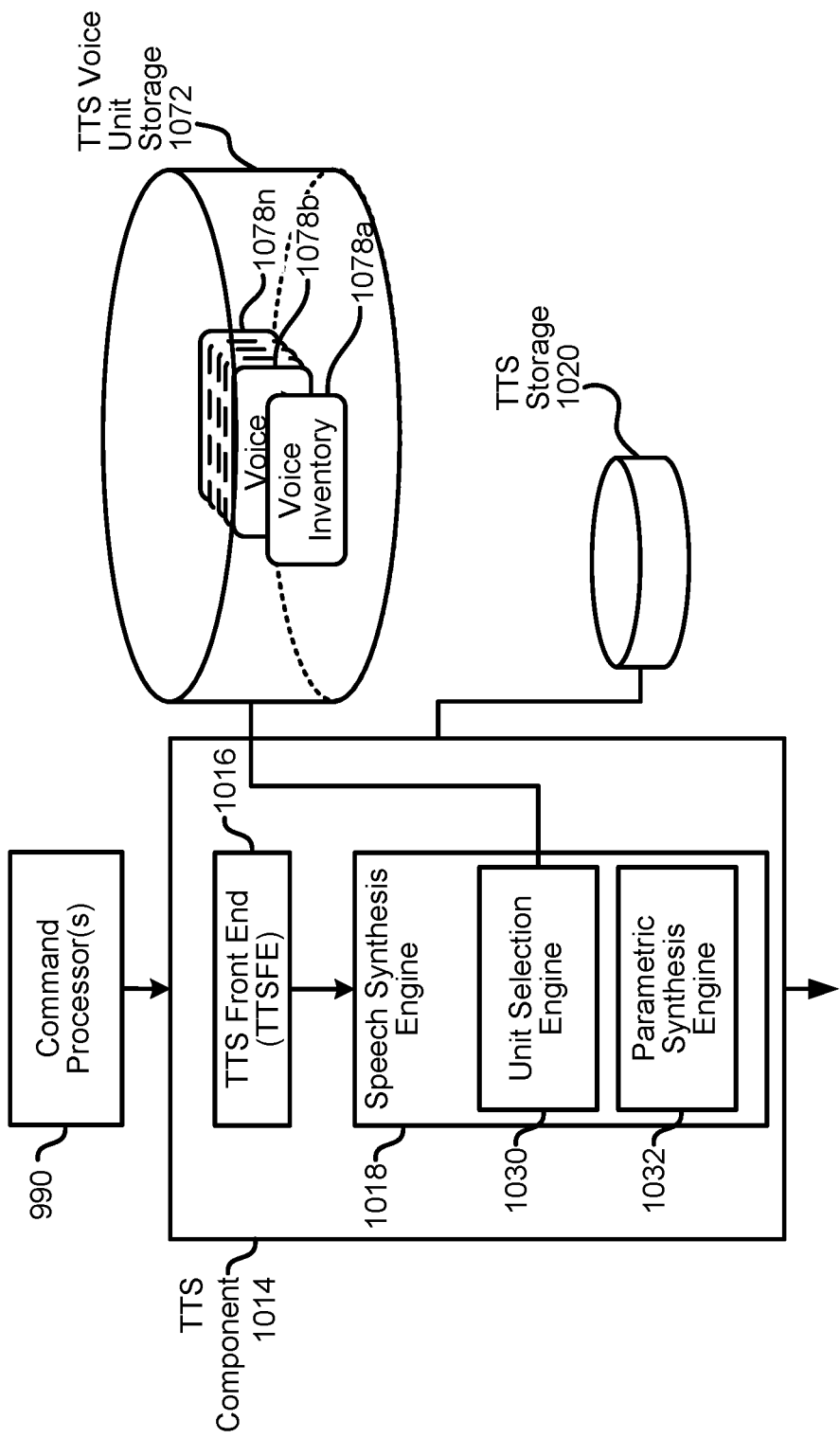
FIG. 10 is a conceptual diagram of how text-to-speech processing is performed according to embodiments of the present disclosure.

As noted above, multiple devices may be employed in a single system. In such a multi-device system, each of the devices may include different components for performing different aspects of the speech processing. The multiple devices may include overlapping components. The components of the device 110 and the server(s) 120, as illustrated in FIGS. 9 and 10, are exemplary, and may be located as a stand-alone device or may be included, in whole or in part, as a component of a larger device or system.

Figure 13:
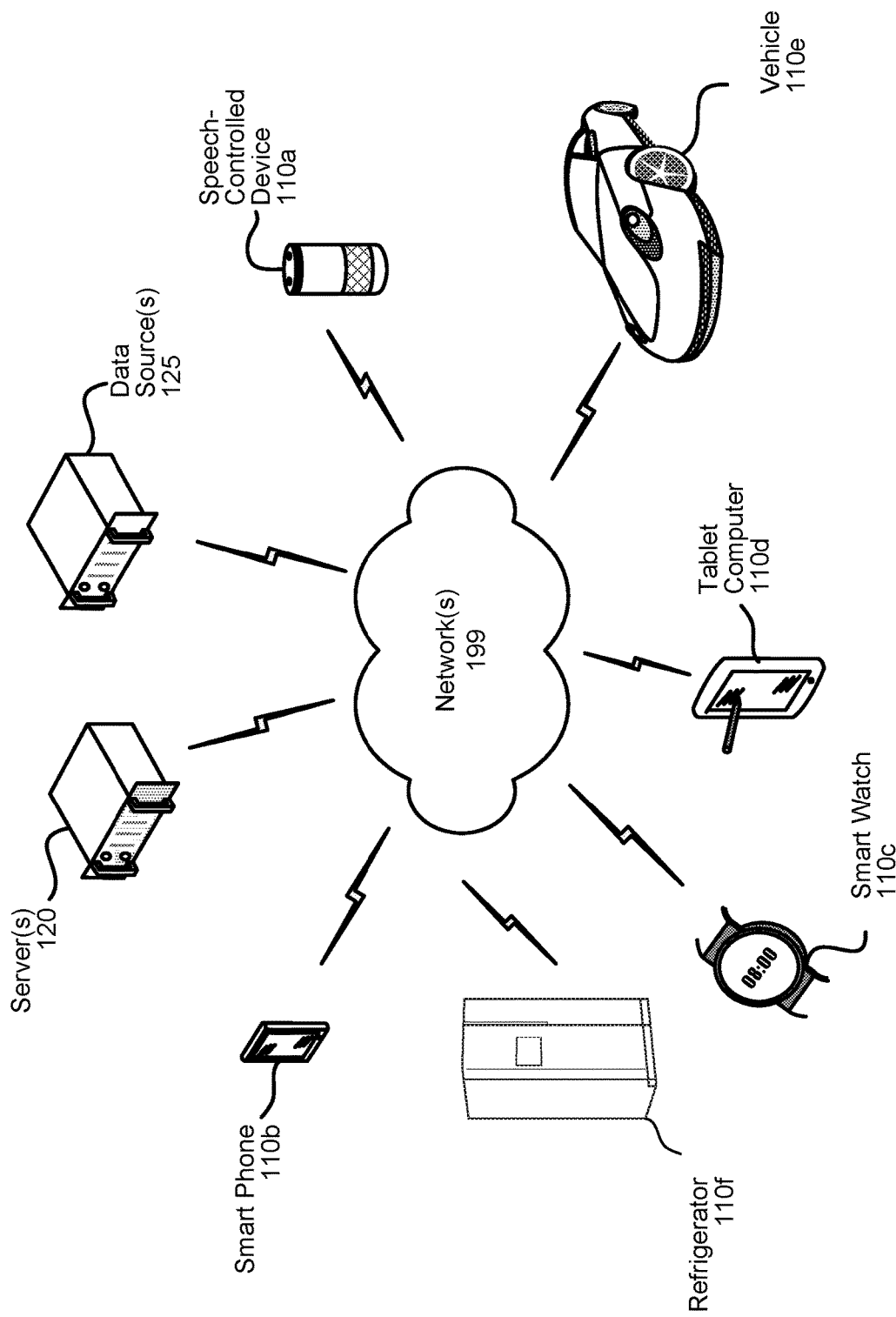
FIG. 13 illustrates an example of a computer network for use with the system.

As illustrated in FIG. 13, multiple devices (120, 125, 110a-110e) may contain components of the system 100 and the devices may be connected over a network(s) 199. The network(s) 199 may include a local or private network or may include a wide network such as the Internet. Devices may be connected to the network(s) 199 through either wired or wireless connections. For example, the speech-controlled device 110a, a smart phone 110b, a smart watch 110c, a tablet computer 110d, a vehicle 110e, and/or a refrigerator 110f may be connected to the network(s) 199 through a wireless service provider, over a WiFi or cellular network connection, or the like. Other devices are included as network-connected support devices, such as the server(s) 120, third party service devices (e.g., the data source device(s) 125), or others. The support devices may connect to the network(s) 199 through a wired connection or wireless connection. Networked devices may capture audio using one-or-more built-in or connected microphones 103 or audio capture devices, with processing performed by ASR, NLU, or other components of the same device or another device connected via the network(s) 199, such as the ASR component 950, the NLU component 960, etc. of one or more servers 120.

The concepts disclosed herein may be applied within a number of different devices and computer systems, including, for example, general-purpose computing systems, systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the components and engines may be implemented as in firmware or hardware, such as the AFE 956, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving query data representing a query for information;
identifying a data structure comprising:
a plurality of nodes that each represent a respective fact, and
a plurality of links that each represent a respective relationship between facts;
identifying a first function corresponding to a potential answer to the query, the first function being dependent upon a first fact corresponding to a first node of the plurality of nodes;
selecting a first subportion of the data structure, the first subportion comprising the first function linking the first node to a second node representing an answer to the query;
identifying a second function corresponding to a potential answer to the query, the second function being dependent upon a second fact corresponding to a third node;
selecting a second subportion of the data structure, the second subportion comprising the second function linking the third node to the second node; and
determining a portion of the data structure to include the first subportion and the second subportion, such that the second node becomes a terminal node of the portion.

2. The computer-implemented method of claim 1, further comprising:
determining a first path of the portion, wherein the first path links the first node to the terminal node using at least the first function;
determining a second path of the portion, wherein the second path links the third node to the terminal node using at least the second function;
determining a first path score corresponding to the first path, the first path score being determined based at least on a first fact credibility score associated with the first fact and a first function credibility score associated with the first function;
determining a second path score corresponding to the second path, the second path score being determined based at least on a second fact credibility score associated with the second fact and a second function credibility score associated with the second function; and
based at least on the first path score and the second path score, determining dialog data to solicit a value corresponding to the first fact.

3. The computer-implemented method of claim 2, wherein:
a third node representing a third fact is linked to the first function, the third node being on the first path and being associated with a third fact credibility score, and the computer-implemented method further comprises:
  determining the first path score by multiplying the first fact credibility score, the third fact credibility score, and the first function credibility score.

4. The computer-implemented method of claim 2, further comprising:
  determining further input data is needed to respond to the query;
  determining a first question to solicit an answer corresponding to the further input data;
  determining a first probability of receiving a first potential answer in response to the first question;
  determining a first number of further questions needed to answered, after receiving the first potential answer, to obtain the further input data;
  determining a first question score corresponding to the first question, the first question score being determined based at least on the first probability and the first number;
  determining a second question to solicit an answer corresponding to the further input data;
  determining a second probability of receiving a second potential answer in response to the second question;
  determining a second number of further questions needed to answered, after receiving the second potential answer, to obtain the further input data;
  determining a second question score corresponding to the second question, the second question score being determined based at least on the second probability and the second number;
  determining the first question score corresponds to a likelihood of fewer further questions than the second question score; and
  based at least on the first question score and the second question score, selecting the first question as the dialog data.

5. A system comprising:
  at least one processor; and
  at least one memory including instructions that, when executed by the at least one processor, cause the system to:
    receive query data representing a query for information;
    determine a portion of a data structure representing facts that may be used to determine an answer to the query;
    determine a first path of the portion, wherein the first path links a first node representing a first fact to a terminal node representing an answer to the query, the first path comprising a first function;
    determine a second path of the portion, wherein the second path links a second node representing a second fact to the terminal node, the second path comprising a second function;
    determine a first path score corresponding to the first path, the first path score being determined based at least on a first fact credibility score associated with the first fact and a first function credibility score associated with the first function;
    determine a second path score corresponding to the second path, the second path score being determined based at least on a second fact credibility score associated with the second fact and a second function credibility score associated with the second function; and
    based at least on the first path score and the second path score, determine dialog data to solicit a value corresponding to the first fact.

6. The system of claim 5, wherein:
  the first function is dependent upon the first fact;
  the second function is dependent upon the second fact; and
  the at least one memory further includes instructions that, when executed by the at least one processor, further cause the system to:
    select a first subportion of the data structure, the first subportion comprising the first function linking the first node to a third node representing the answer to the query;
    select a second subportion of the data structure, the second subportion comprising the second function linking the second node to the third node; and
    determine the portion to include the first subportion and the second subportion, such that the third node becomes the terminal node of the portion.

7. The system of claim 6, wherein the at least one memory further includes instructions that, when executed by the at least one processor, further cause the system to:
  determine the first subportion is associated with a first subportion score;
  determine the second subportion is associated with a second subportion score;
  determine the first subportion score is higher than the second subportion score; and
  associate the first subportion score with the terminal node.

8. The system of claim 5, wherein the at least one memory further includes instructions that, when executed by the at least one processor, further cause the system to:
  determine the first path score by multiplying the first fact credibility score by the first function credibility score.

9. The system of claim 5, wherein:
  the first node is linked to the first function;
  a third node representing a third fact is linked to the first function, the third node being on the first path and being associated with a third fact credibility score; and
  the at least one memory further includes instructions that, when executed by the at least one processor, further cause the system to:
    determine the first path score by multiplying the first fact credibility score, the third fact credibility score, and the first function credibility score.

10. The system of claim 9, wherein the at least one memory further includes instructions that, when executed by the at least one processor, further cause the system to:
  determine a user corresponding to the query;
  determine a profile associated with the user; and
  determine the third fact is represented in the profile.

11. The system of claim 5, wherein the at least one memory further includes instructions that, when executed by the at least one processor, further cause the system to:
  cause the dialog data to be output;
  receive response data corresponding to the first fact; and
  determine output data responsive to the query using the first function and the first fact.

12. The system of claim 9, wherein the at least one memory further includes instructions that, when executed by the at least one processor, further cause the system to:
  determine a value for the third fact is unknown,
  wherein the dialog data is further determined to solicit a value corresponding to the third fact.

13. The system of claim 5, wherein:
the first node is linked to the first function,
the first function is linked to a third node representing an output of the first function,
the third node is linked to a third function having a third function credibility score,
the third function is linked to the terminal node, and
the at least one memory further includes instructions that, when executed by the at least one processor, further cause the system to:
   determine a value by multiplying the first fact credibility score by the first function credibility score, wherein the value corresponds to an output of the first function; and
   determine the first path score by multiplying the value by the third function credibility score.

14. A computer-implemented method comprising:
receiving query data representing a query for information;
determining further input data is needed to respond to the query;
determining a first question to solicit an answer corresponding to the further input data;
determining the first question may be responded to using at least a first potential answer;
determining a first probability of receiving the first potential answer in response to the first question;
determining a first number of further questions needed to obtain the further input data in response to receipt of the first potential answer;
determining a first score representing a likelihood that at least one further question will need to be answered after the first question to obtain the further input data, the first score being determined based at least on:
   the first question being capable of being responded to using at least the first potential answer,
   the first probability, and
   the first number;
determining a second question to solicit an answer corresponding to the further input data;
determining a second score representing a likelihood of at least one further question to be answered after the second question to obtain the further input data; and
based at least on the first score and the second score, selecting the first question for output to a user.

15. The computer-implemented method of claim 14, further comprising:
multiplying the first probability by the first number to obtain a third score; and
determining the first score using the third score.

16. The computer-implemented method of claim 15, further comprising:
determining the first question may be responded to using a third potential answer;
determining a third probability of receiving the third potential answer in response to the first question;
determining a third number of further questions needed to obtain the further input data in response to receipt of the third potential answer;
multiplying the third probability by the third number to obtain a fourth score; and
at least partially determining the first score by summing the third score and the fourth score.

17. The computer-implemented method of claim 14, further comprising:
determining the query is associated with a user profile; and
determining the user profile indicates a preference for a short dialog to obtain further input data.

18. The computer-implemented method of claim 14, further comprising:
receiving first data in response to the first question;
determining, after receiving the first data, that second further input data is needed to respond to the query;
determining a third question to solicit an answer corresponding to the second further input data;
determining the third question is associated with a third score representing a likelihood of at least one further question to be answered after the third question to obtain the second further input data;
determining a fourth question to solicit an answer corresponding to the second further input data;
determining the fourth question is associated with a fourth score representing a likelihood of at least one further question to be answered after the fourth question to obtain the second further input data; and
based at least on the third score and the fourth score, selecting the third question for output to the user.

19. The computer-implemented method of claim 14, further comprising:
determining a first credibility score associated with the first question; and
determining a second credibility score associated with the second question,
wherein the first question is further selected based at least on the first credibility score and the second credibility score.

* * * * *